(12) United States Patent
Yamashita et al.

(10) Patent No.: US 6,950,026 B2
(45) Date of Patent: Sep. 27, 2005

(54) METHOD FOR COMPLEMENTING PERSONAL LOST MEMORY INFORMATION WITH COMMUNICATION, AND COMMUNICATION SYSTEM, AND INFORMATION RECORDING MEDIUM THEREOF

(75) Inventors: Koji Yamashita, Tokyo (JP); Kenichi Matsumura, Tokyo (JP); Hidekazu Kubota, Tokyo (JP); Toyoaki Nishida, Tokyo (JP); Tomohiro Fukuhara, Kanagawa (JP); Kazunori Terada, Gifu (JP); Shintaro Azechi, Gifu (JP)

(73) Assignee: National Institute of Information and Communication Technology Incorporated Administrative Agency, Tokyo (JP)

(*) Notice: Subject to any disclaimer, the term of this patent is extended or adjusted under 35 U.S.C. 154(b) by 82 days.

(21) Appl. No.: 10/615,190

(22) Filed: Jul. 9, 2003

(65) Prior Publication Data

US 2004/0160325 A1 Aug. 19, 2004

(30) Foreign Application Priority Data

Feb. 17, 2003 (JP) ........................ 2003-038009

(51) Int. Cl.[7] .............................................. G08B 23/00
(52) U.S. Cl. .............................. 340/573.1; 340/539.22; 600/300
(58) Field of Search .............................. 340/573.1, 517, 340/518, 532, 539.32, 3.1, 3.42, 539, 3.43, 573.4; 600/300; 700/48, 16, 17; 705/1, 2

(56) References Cited

U.S. PATENT DOCUMENTS 5,493,692 A * 2/1996 Theimer et al. ........... 455/26.1
5,890,905 A * 4/1999 Bergman .................... 434/118
6,377,296 B1 * 4/2002 Zlatsin et al. ............... 348/143

FOREIGN PATENT DOCUMENTS

JP           2000-331089       9/1999

OTHER PUBLICATIONS

Wearable computers as an aid to human memory□□Brown, P.J.; Bovey, J.D.;□□Developments in Personal Systems, IEE Colloquium on , Jun. 23, 1995 □□pp.: 6/1–6/3□□□□.*

(Continued)

Primary Examiner—Jeffery Hofsass
Assistant Examiner—Eric Blount
(74) Attorney, Agent, or Firm—James R. Burdett

(57) ABSTRACT

The present invention enables appropriate behavior of an individual who has problems with memory, and behavior support thereof with certainty. The individual who has problems with memory always carries the portable communication terminal and loads and collects various types of information along with an ID through the communication network as behavior monitoring information. Also various types of provided information (e.g. map information) are collected. When a specific status information (e.g. forgetting the road to take) of the individual who carries the portable communication terminal is loaded, memory support information (behavior support information) is generated by conversation, text and image, so that the specific status where the individual who lost memory cannot take an action to be performed next can be individually dispelled on the spot based on the information collected in the past and various types of provided information, and this memory support information is transferred to the individual carrying the portable communication terminal. In this way, information for dispelling a specific status where an individual who lost memory cannot take an action to be performed next on the spot can be implemented by inference, personally and instantaneously.

14 Claims, 17 Drawing Sheets

U.S. PATENT DOCUMENTS

| | | | | |
|---|---|---|---|---|
| 6,512,456 | B1 | * | 1/2003 | Taylor, Jr. ................. 340/573.1 |
| 6,513,046 | B1 | * | 1/2003 | Abbott et al. ............ 707/104.1 |
| 6,540,674 | B2 | * | 4/2003 | Zadrozny et al. ........... 600/300 |
| 6,579,231 | B1 | * | 6/2003 | Phipps ....................... 600/300 |
| 6,611,206 | B2 | * | 8/2003 | Milanski et al. ......... 340/573.1 |
| 2001/0040986 | A1 | * | 11/2001 | Farringdon et al. ......... 382/118 |

OTHER PUBLICATIONS

Constructing and sharing everyday memory for community knowledge co-evolution☐☐Hirata, T.; Murakami, H.; Nishida, T.; Uemura, S.;☐☐Knowledge–Based Intelligent Engineering Systems and Allied Technologies, 2000.*

Koji Yamashita et al., "Behavior Support System for Compensating QOL of the Memory Weak", The 16th Annual Conference of Japanese Society for Artificial Intelligence 2002, 3B4–04.

* cited by examiner

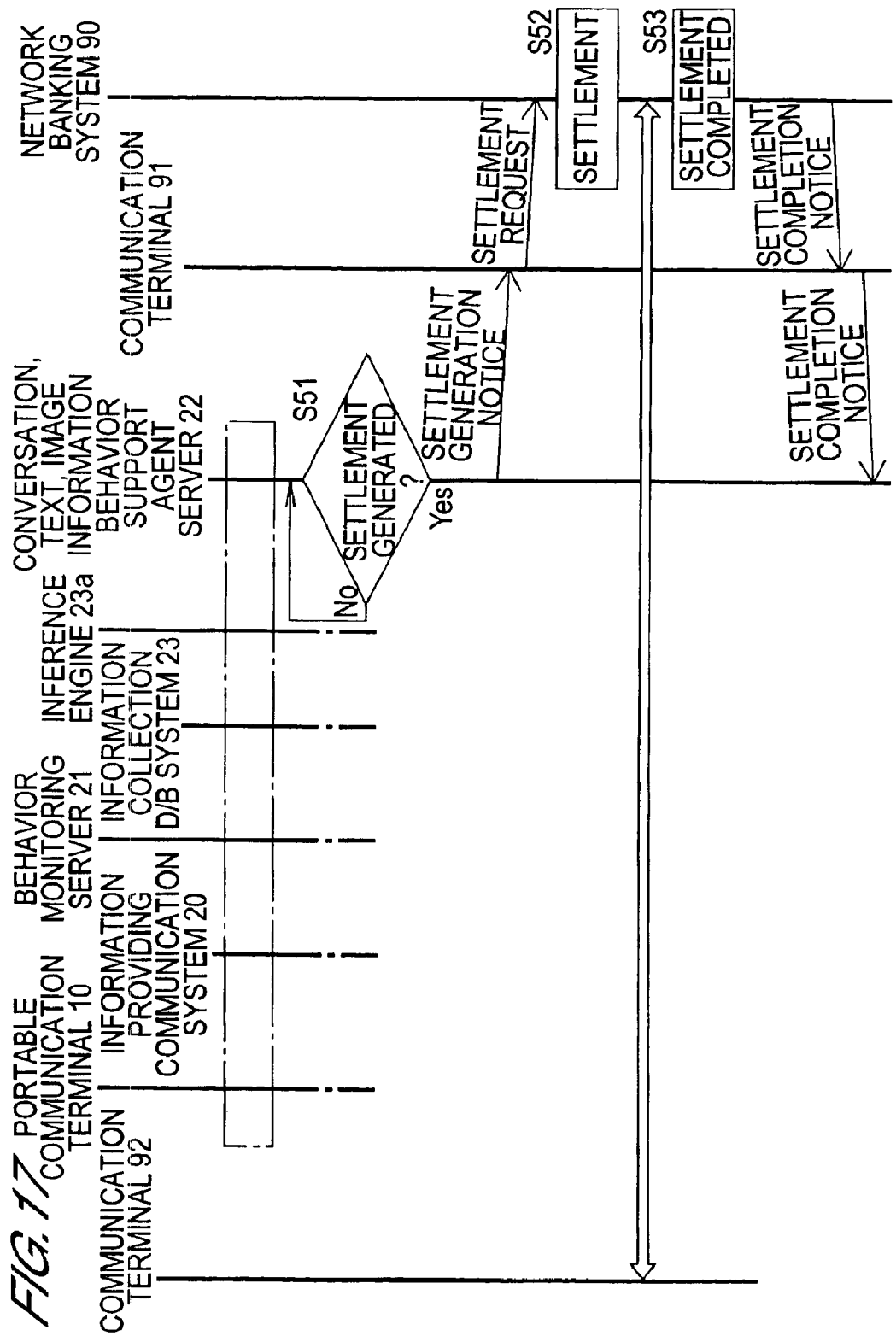

METHOD FOR COMPLEMENTING PERSONAL LOST MEMORY INFORMATION WITH COMMUNICATION, AND COMMUNICATION SYSTEM, AND INFORMATION RECORDING MEDIUM THEREOF

BACKGROUND OF THE INVENTION

1. Field of the Invention

The present invention relates to a method for complementing personal lost memory information with communication, for providing information for solving the problems in specific statuses, where personal memory is lost and action to be taken next cannot be performed, on the spot, by searching and inferring from personally and instantaneously collected information, and a communication system, and an information recording medium thereof.

2. Description of Related Art

Examples of a specific status where an individual who lost memory cannot take an action to be performed next (referred to as "failure of memory" whenever appropriate) are daily forgetfulness, weakening of memory due to aging, and disorders of memory due to brain injury and dementia. Such various problems located in memory ("various problems located in memory" are referred to as "failure of memory" whenever appropriate) are, for example, not recalling the name of a person or object, leaving an object behind, not recalling a place where an object is put, not recalling a thing which the individual has just been doing, forgetting an important appointment, and forgetting something which should be performed.

Such failures of memory causes personal and social problems, such as a loss of social trust, a drop in the sense of self sufficiency, and loss of an independent social life. In other words, modern society expects a high memory load, and does not compensate for the quality of life (QOL) of an individual who has problems with memory.

To complement these kinds of failures of memory, the "memorandum function, telephone book function and schedule management function" of known electronic dictionaries, electronic notebooks, portable telephones and PDAs (Personal Digital Assistant) are available. With these, information to be easily forgotten is manually stored in a main storage of the device or a data base (D/B) equipment on a communication network in advance, and is read and referred to whenever necessary.

In this case, only pre-stored information can be referred to, and is far from behavior support to compensate the above mentioned QOL of individuals who have problems with memory. A proposal for such behavior support is, for example, a "behavior support system for compensating the QOL of memory impaired individuals" proposed by the present inventors. In the behavior support of this proposal, development of a memory support system using conventional information technology for individuals who have problems with memory and a direction of a social environment system which recognizes the actual world and provides information according to the situation, are shown (see Reference 1, for example).

Another proposal is, for example, scanning enormous amounts of information, which is generated in daily life, as quickly and completely as possible, and collecting, organizing and storing the content thereof in detail so that advanced processing and effective use of this information is possible thereafter. In other words, for memories and ideas which tend to be lost in an individual, each element is completely stored in association with each other, so that the detailed content thereof make as much sense as possible.

Reference 1: Koji Yamashita, Tomohiro Fukuhara, Kenichi Matsumura, Kazunori Terada, Hidekazu Kubota, Shintaro Azechi, Toyoaki Nishida: "Behavior support system for compensating QOL of the memory weak", the 16th Annual Conference of Japanese Society for Artificial Intelligence 2002, 3B4-04.

Reference 2: Japanese Patent Laid-Open No. 2000-331089: "Method and device for personal life information and action management", Official Gazette (Abstract).

SUMMARY OF THE INVENTION

However, in the above mentioned prior art, Reference 1 proposes only a direction of behavior support, and does not describe the means of implementation.

The above mentioned Reference 2 states that for the memories and ideas of an individual which tend to be lost, store each element in association with each other so that the detailed content thereof make as much sense as possible. However, nothing is written about artificial intelligence inference and retrieval for supporting the behavior of an individual who has problems with memory, and on information processing for individual behavior support. In other words, daily behavior support for an individual who has problems with memory cannot be implemented.

With the foregoing in view, it is an object of the present invention to provide a method for complementing personal lost memory information with communication, and a communication system and information thereof, so that information for dispelling a specific status, where an individual cannot take an action to be performed next because of memory loss, can be provided, on the spot, by personal and instantaneous inference and retrieval, and appropriate behavior of an individual who has problems with memory and behavior support thereof becomes possible with certainty.

To achieve the above mentioned object, the method for complementing personal lost memory information with communication is for providing information for dispelling a specific status, where an individual who lost personal memory cannot take an action to be performed next, and is comprised of a step of a communication network side equipment collecting daily behavior monitoring information of the individual transferred from a communication terminal via a communication line, a step of the communication network side equipment loading information on the specific status where the individual who lost personal memory cannot take an action to be performed next, which is transferred the communication terminal, via a communication line, and a step of the communication network side equipment generating memory support information by one or both of retrieval and inference for dispelling a specific status where the individual who lost personal memory cannot take an action to be performed next, based on the behavior monitoring information collected by the communication network side equipment, and transferring the memory support information to the communication terminal via the communication line.

In the case of this method for complementing personal lost memory information with communication according to this invention, information provisions for dispelling the specific status where an individual who lost personal memory cannot take an action to be performed next, on the spot, becomes possible with certainty by personal and immediate inference, and appropriate behavior of an individual who has a problem with memory (e.g. behavior support for compensating the QOL of an individual who has problems with memory) and behavior support thereof, can be implemented with certainty.

The behavior monitoring information of the method of the present invention includes the current absolute position information of the communication terminal, and is at least one type of communication information of conversation, text and image in the communication terminal, where at least one type of information of map, traffic and weather loaded from equipment on the communication network is newly added to the behavior monitoring information. The memory support information is at least one type of information of conversation, text and image, and the behavior monitoring information is corrected by an external terminal. Also when the specific status is not dispelled by the transfer of the memory support information from the communication network side equipment to the communication terminal and the specific status information is transferred again from the communication terminal to the communication network side equipment, the communication network side equipment transfers at least one of conversation, text and image information to the communication terminal, and executes the behavior monitoring again, executes one or both of retrieval and inference again from this information, and generates new memory support information. Also in the generation of the new memory support information, at least one type of information of map information, traffic information which includes the structure of roads inside a facility, and weather information, is loaded from equipment on the communication network, the new memory support information is generated by one or both of retrieval and inference again, and generates the memory support information based on at least one of the following (a), (b) and (c); (a) level, that is the degree of the problem with memory, (b) layer, that is the depth of the hierarchical explanation of the memory support information with respect to the degree of the problem with memory, and (c) range, that is the range of memory support information with respect to the degree of the problem with memory, and in the generation of the memory support information by one or both of retrieval and inference based on at least one of the level, layer and range, the stage of the level, layer and range for the individual who carries the communication terminal is automatically changed and set when the stage of the level, layer and range begin set change, and the memory support information is generated by one or both of the next retrieval and inference, based on this new stage of the level, layer and range.

In the method of the present invention, the information of the specific status indicates the information on the specific status, including the length of time for which the absolute position information of the communication terminal does not change, and being subject to the specific status is identified by comparing this information on the specific status and a predetermined threshold value, and the information on the specific status indicates the status of an object left behind by a worsening or interruption of the field strength of the communication line connection status between the communication terminal and a non-contact storage element with no power supply, which is attached to the object, and the memory support information is notification of the object left behind.

The memory information complementary communication system of the present invention to achieve the above object is for providing information for dispelling a specific status where an individual who lost personal memory cannot take an action to be performed next, and is comprised of a portable communication terminal for transferring personal daily behavior monitoring information and specific status information where the individual who lost personal memory cannot take an action to be performed next via a communication line, and a communication network side equipment which collects the behavior monitoring information from the portable communication terminal, receives the information on the specific status where the individual who lost personal memory cannot take an action to be performed next, which is transferred from the portable communication terminal, via the communication line, generates memory support information to dispel this specific status by one or both of retrieval and inference, and transfers the memory support information to the portable communication terminal via the communication line.

The system of the present invention is for dispelling a specific status where an individual who lost personal memory cannot take an action to be performed next, and is comprised of a non-contact storage element with no power supply, which is attached to the individual, a plurality of fixed communication terminals which transfer personal daily behavior monitoring information and information on the specific status information where the individual who lost personal memory cannot take an action to be performed next via a communication line by a radio line connection with the non-contact storage element, and a communication network side equipment, which collects the behavior monitoring information from each one of the plurality of fixed communication terminals, receives the information on the specific status where the individual who lost personal memory cannot take an action to be performed next, which is transferred from the fixed communication terminal, via the communication line, generates memory support information to dispel this specific status by one or both of retrieval and inference, and transfers the memory support information to the fixed communication terminal via the communication line.

In the system of the present invention, the portable communication terminal or the fixed communication terminal further comprises absolute position information detection means for transferring the current absolute position information as the behavior monitoring information, and information transfer means for transferring at least one type of communication information of conversation, text and image, and the communication network side equipment further comprises a behavior monitoring server, an information behavior support agent server for generating the memory support information by conversation, text and image, and information collection data base means for loading and storing behavior monitoring information and at least one of map information, traffic information and weather information.

The system of the present invention further comprises information providing means for newly adding at least one type of information of map, traffic and weather to the behavior monitoring information on the communication line network, and the portable communication terminal further comprises radio communication means for detecting the status of an object left behind by a worsening or interruption of the field strength of the communication line connection status with the non-contact storage element with no power supply, which is attached to the object carried by the individual who carries the portable communication terminal, so that the connection network side equipment generates and transfers the memory support information of an object left behind.

Just like the above mentioned method for complementing personal lost memory information with communication, the memory information complementary communication system enables appropriate behavior of an individual who has problem with personal memory and behavior support thereof with certainty.

The information recording medium of the present invention to achieve the above mentioned object has a computer execute a step of transferring personal daily behavior monitoring information and information on a specific status where an individual who lost personal memory cannot take an action to be performed next via a communication line.

Also the information recording medium of the present invention has a computer execute a step of collecting behavior monitoring information from a portable communication terminal, a step of receiving information on a specific status where an individual who lost personal memory cannot take an action to be performed next which is transferred from the portable communication terminal, via a communication line, a step of generating the memory support information for dispelling this specific status by one or both of retrieval and inference, and a step of transferring the generated memory support information to the portable communication terminal via the communication line.

The information recording medium of the present invention has a computer execute a step of transferring personal daily behavior monitoring information and information on a specific status information where an individual who lost personal memory cannot take an action to be performed next by a radio line connection with a non-contact storage element with no power supply attached to the individual, and also has a computer execute a step of collecting behavior monitoring information from each one of a plurality of fixed communication terminals, a step of receiving information on a specific status where an individual who lost personal memory cannot take an action to be performed next, which is transferred from the fixed communication terminal via a communication line, a step of generating the memory support information for solving this specific status by one or both of retrieval and inference, and a step of transferring the memory support information to the fixed communication terminal via the communication line.

In the information recording medium of this invention, the present invention can be provided via the information recording medium (e.g. packaged software), or by downloading/installing information from the communication network. Since this invention can be easily implemented by a microcomputer, which is installed in various devices, flexibility thereof is improved.

BRIEF DESCRIPTION OF THE DRAWINGS

The foregoing and other objects, features and advantages of the present invention will be better understood from the following description taken in connection with the accompanying drawings, in which:

FIG. 17 is a flow sequence diagram depicting the processing procedure of the operation of the fourth embodiment.

DESCRIPTION OF THE PREFERRED EMBODIMENTS

The preferred embodiments of "method for complementing personal lost memory information with communication, and communication system, and information recording medium thereof" of the present invention will now be described.

In this description, a general configuration and positional relationships are shown, sufficient enough to allow understanding of the present invention. Therefore the present invention is not limited to the following embodiments, and can be applied to various aspects based on the claims.

(Basic Functions of First Embodiment)

Figure 1:
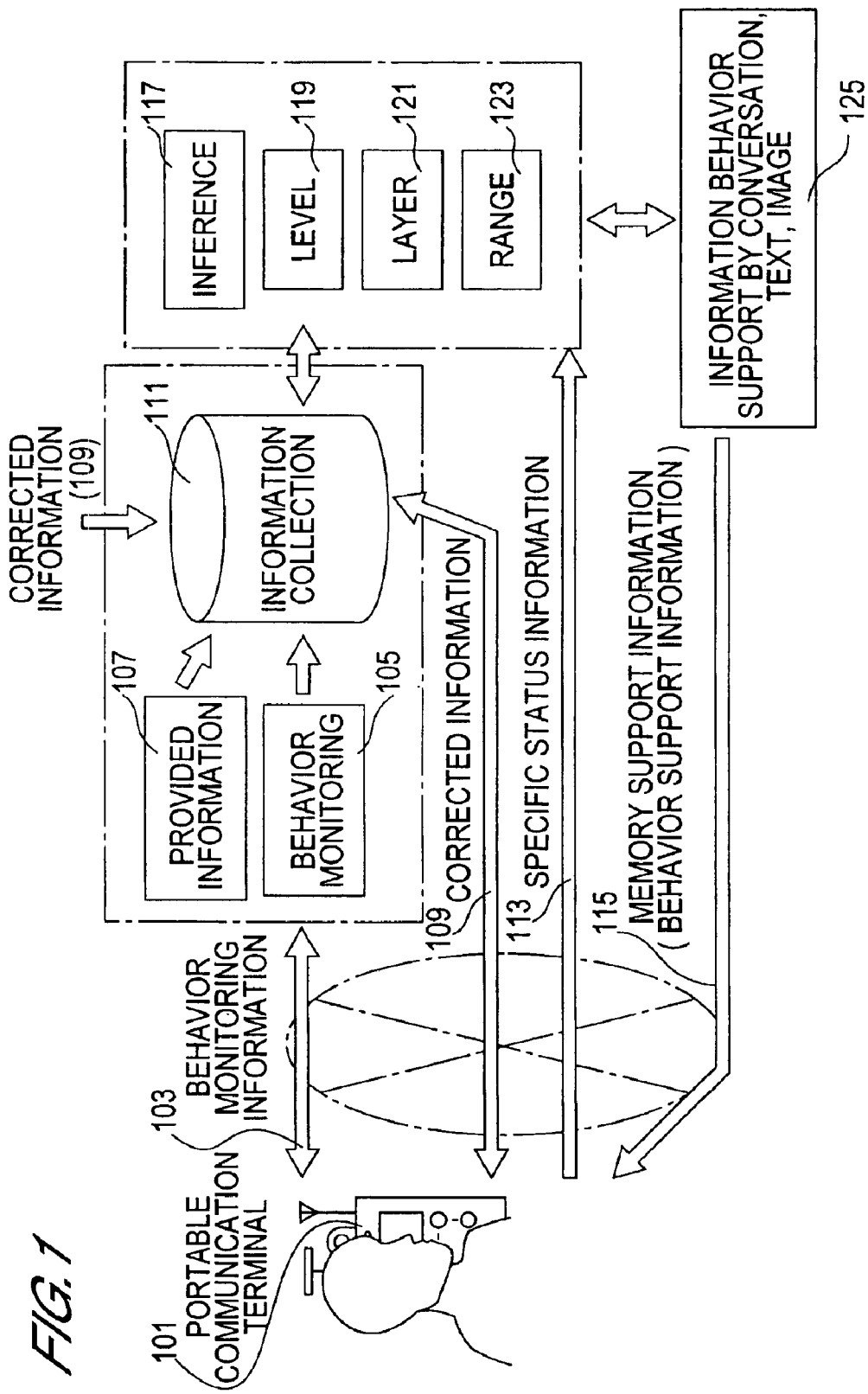
FIG. 1 is a diagram depicting the functional configuration of the first embodiment.

FIG. 1 is a diagram depicting the functional configuration of the first embodiment.

Referring to FIG. 1, an individual who has problems with memory always carries the portable communication terminal 101, and transfers the following information, (a), (b), (c), (d) and (e) via the communication network. "(a): absolute self position information, (b): schedule management information and memorandums recorded, (c): information of portable telephone conversation via radio block, (d): text information, such as Internet connection, in the portable telephone, and (e): photographed surrounding image information".

This information is monitored as the behavior of the individual carrying the portable communication terminal 101 (individual who has problems with memory), and is collected for each personal identification code (ID) of the individual. In this information collection 111, various information (map information, traffic information, weather information, to be described later) which is provided for generating memory support information 115, (this is information for complementing personal lost memory with communication, and is also called "behavior support information 115") of the individual carrying the portable communication terminal 101, is loaded in association with each information of the above mentioned (a) to (e) (e.g. time and date, location).

Then the specific status information 113 of the individual carrying the portable communication terminal 101 is loaded by way of behavior monitoring 107, and "retrieval and inference 117" thereof are executed. Here the specific status information 113 is a status where the individual carrying the portable communication terminal 101, who has problems with memory, cannot take normal action to be performed next due to loss of memory.

The status where the individual who lost memory cannot take an action to be performed next is the above mentioned (a) daily forgetfulness, (b) weakening of memory due to aging, and (c) disorders of memory due to brain injury and dementia, in this case.

Here for the status where the individual who lost memory cannot take an action to be performed next, "retrieval and inference 117" for generating memory support information (behavior support information) 115 by conversation, text and image, are executed so as to dispel the specific status. In "retrieval and inference 117", the above mentioned (a) daily forgetfulness to (c) disorders of memory due to brain injury and dementia are regarded as levels 119 (1, 2 and 3) respectively. In other words, "Levels 119 (1, 2 and 3)" indicate the degree of a memory problem.

Also the hierarchy of the memory support information (behavior support information) 115 is regarded as "layer 121 (1 . . . n)". This "layer 121 (1 . . . n)" is the quantity of memory support information (behavior support information) 115 with respect to the above mentioned degree of memory problem. In other words, "layer 121 (1 . . . n)" is the depth of description and the quantity of description for each "level 119 (1, 2 and 3)", where memory support information (behavior support information) 115 increases as the level 119 increases.

Also the generation range 123 of memory support information (behavior support information) 115 is regarded as "range 123 (1 . . . n)", and "retrieval and inference 117" thereof are executed. This "range 123 (1 . . . n)" is a range 123 of memory support information 115 with respect to the above mentioned degree of memory problem. In other words, "range 123 (1 . . . n)" is the range 123 of description for an individual who has a problem with memory, and the range 123 of description (memory support information/behavior support information) 115 does not increases as "level 119 (1, 2 and 3)" increase. This is because in the case of (c) disorder of memory due to brain injury and dementia" in "level 119 (3)", for example, increasing memory support information 115, which is the quantity of description, makes it difficult for the individual who has a problem with memory (see the above mentioned (c)) to understand the memory support information 115 instantaneously, and the specific status where the individual who lost memory cannot take an action to be performed next cannot be dispelled on the spot (behavior support to the individual who has a problem with memory becomes uncertain).

"Level 119 (1, 2 and 3)", "layer 121 (1 . . . n)", and "range 123 (1 . . . n)" are manually set by the individual or administrator of the memory information complementary communication system initially. Then "level 119 (1, 2 and 3)", "layer 121 (1 . . . n)" and "range 123 (1 . . . n)" are automatically changed and set by linking "retrieval and inference 117" and "conversation, text and image behavior support", so that optimum behavior support information 115 for the specific status information 113 is provided.

For example, "level 119 (1, 2 and 3)", "layer 121 (1 . . . n)", and range 123 (1 . . . n)" are non-periodically and automatically changed and set for each individual who has a problem with memory depending on the length of time the individual is standing when the individual becomes lost, and the conversation status between the individual who has a problem with memory and "conversation, text and image information behavior support" and the next memory behavior support information 115 (behavior support information 115) is transferred to the individual carrying the portable communication terminal 101.

In other words, memory support information 115 to dispel the specific status is generated for each individual who has a problem with memory according to the situation, such that the memory support information 115 matches the degree of the situation and also matches the specific status.

Memory support information 115 generated in this way is transferred to the individual carrying the portable communication terminal 101.

If the status where the individual cannot take an action to be performed next continues after this transfer, that is, if the specific status information 113 is transferred again (e.g. the case when the direction to take remains unclear, that is, the case when time the individual is standing exceeds a predetermined time), a combined setting of "level 119 (1, 2 and 3)", "layer 121 (1 . . . n)" and "range 123 (1 . . . n)", which were initially set individually by manual operation, is automatically changed. And more detailed memory support information 115 is transferred.

In the above mentioned information collection 111, the individual carrying the portable communication terminal 101 and the administrator of the memory information complementary communication system can check and correct the content of the settings whenever necessary.

In this way, the memory support information 115 for dispelling the specific status where an individual who lost memory cannot take an action to be performed next can be provided with certainty, personally and instantaneously by "retrieval and inference 117", so that behavior support to an individual who has problems with memory can be implemented with certainty.

Now the means of implementing the basic functions of the first embodiment will be described.

(Configuration and Individual Operation of Key Components of First Embodiment)

Figure 2:
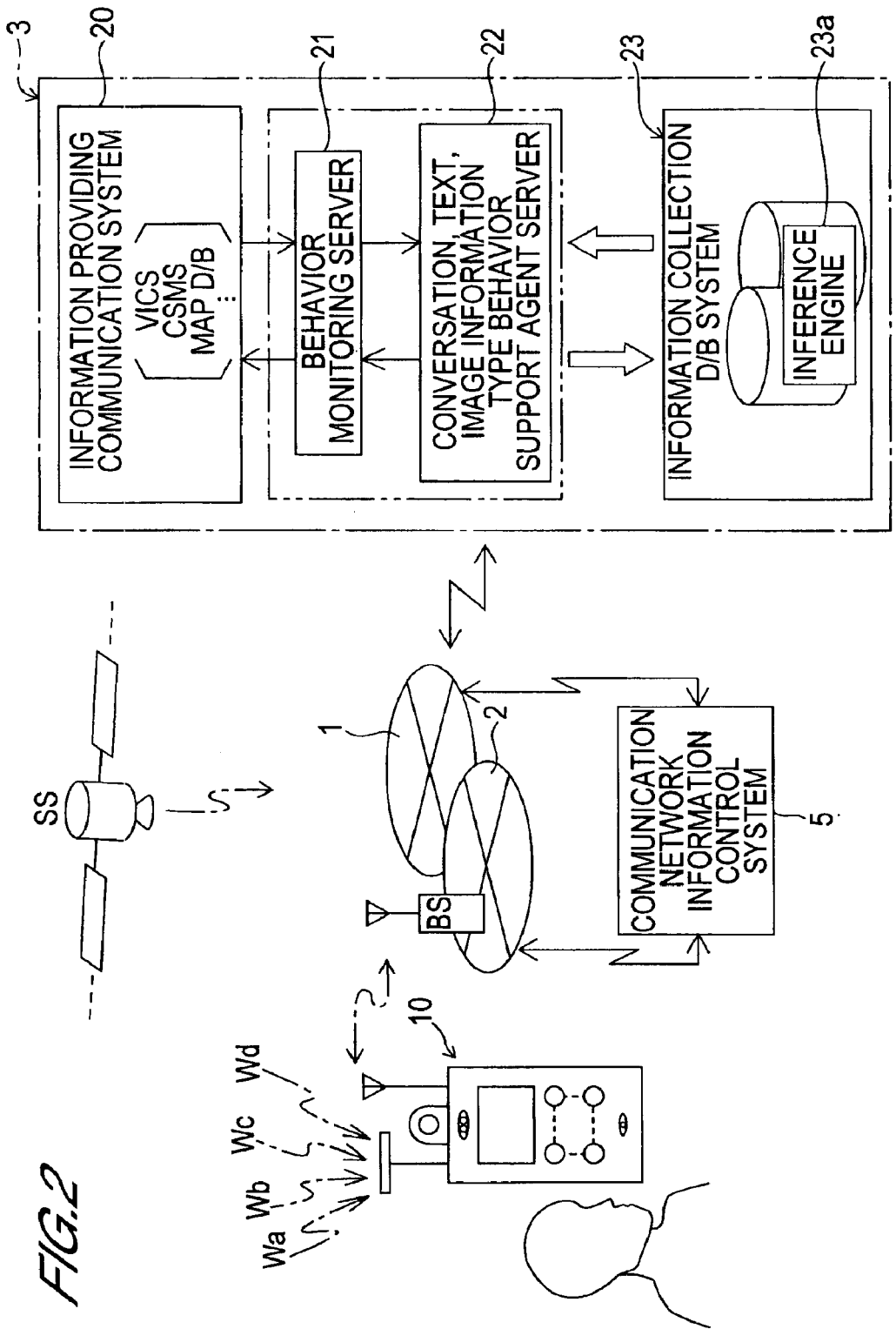
FIG. 2 shows a bidirectional communication network diagram depicting a configuration example of the first embodiment.

FIG. 2 shows a bidirectional communication network diagram depicting a configuration example of the first embodiment.

Referring to FIG. 2, the bidirectional communication network of the configuration example of the first embodiment comprises an analog or digital transmission type cable communication network 1 and radio communication network 2 which has cell base stations (BS) in a cellular digital mobile communication network.

This cable communication network 1 and radio communication network 2 are combined and are called a "communication network" when appropriate.

The configuration where each equipment in FIG. 2 is connected to the communication network is the "bidirectional communication network" referred to in the present invention.

The communication network accommodates the communication network side equipment 3 as the memory information complementary communication system, communication network information control system 5, and portable communication terminal 10 (corresponds to the communication terminal in the present invention (claims)), and also has a GPS satellite SS which is airborne.

The communication network side equipment 3 is comprised of an information providing communication system 20 (corresponds to the information providing means in the present invention (claims)), behavior monitoring server 21, behavior support agent server 22, information collection data base (D/B) system 23 (corresponds to the information collection data base means in the present invention (claims)), and this information collection D/B system 23 has an inference engine 23a which includes a D/B retrieval engine.

The information providing communication system 20 is comprised of a map information providing system (e.g. commonly known as a unit for car navigation), a traffic information providing system (e.g. VICS: Vehicle Information and Communication System) for providing traffic information (e.g. information on roads temporarily closed to vehicles, information on seasonal railroad trains, information on newly built buildings and buildings torn down), and weather information providing system (e.g. CSMS: Computer System for Meteorological Services) for providing weather information, such as weather conditions and weather forecasts of each location).

Now operation of each key component shown above will be described.

The cable communication network 1 and radio communication network 2 (communication network) perform communication transfers based on TCP/IP (Transmission Control Protocol/Internet Protocol).

This bidirectional communication network will now be described using the Internet, represented by TCP/IP.

The communication network side equipment 3 transfers the memory support information for the individual carrying the portable communication terminal 10 to the portable communication terminal 10 based on various information from the portable communication terminal 10 and information providing communication system 20.

The communication network information control system 5 comprises a multiplexer, mobile communication controller and switchboard, which are not illustrated, for accommodating the radio communication network 2 in the cable communication network 1.

The portable communication terminal 10, always carried by the individual who has problems with memory, transfers the absolute self position information (two-dimensional or three-dimensional) which is measured at a predetermined interval, and the input information (e.g. schedule management information) to the communication network side equipment 3, and has conversation with the radio communication network 2 via the radio block using the portable telephone. The portable communication terminal 10 also transfers exchanges of text information (Internet connection by the portable telephone) and image information on the surroundings which were photographed intermittently (or continuously in some cases) to the communication network side equipment 3 (for a configuration of the portable communication terminal 10 see FIG. 3).

The map information providing system of the information providing communication system 20 (communication network side equipment 3) is known as a unit which provides map information used for car navigation, and the traffic information providing system is for providing traffic information (traffic, railroads, roads, buildings), and is, for example, a VICS (Vehicle Information and Communication System). The weather information providing system of the information providing communication system 20 provides such weather information as the weather condition and weather forecast of each location, and is, for example, CSMS (Computer System for Meteorological Services).

The behavior monitoring server 21 monitors various information from the portable communication terminal 10 and the information providing communication system 20, and outputs the information to the information collection D/B system 23.

The behavior support agent server 22, for providing memory support information (behavior support information) by conversation, text and image information, interlocks with the inference engine 23a, which performs retrieval and inference (only inference is mentioned whenever appropriate), and generates and transfers "memory support information" to the individual carrying the portable communication terminal 10.

The information collection D/B system 23 stores behavior monitoring information from the portable communication terminal 10 and various information from the information providing communication system 20.

The inference engine 23a executes artificial intelligence inference for the "specific status information" by accessing various information for each identification code (ID) of the individual who has problems with memory, which is stored in the information collection D/B system 23, and exchanges information with the behavior support agent server 22, and generates "memory support information (behavior support information" for the individual carrying the portable communication terminal 10.

The GPS satellite SS transmits GPS radio waves (GPS radio waves Wa–Wc or Wa–Wd from three or four GPS satellites SS respectively) to obtain two-dimensional or three-dimensional self position information of the portable communication terminal 10 carried by the individual who has problems with memory.

Figure 3:
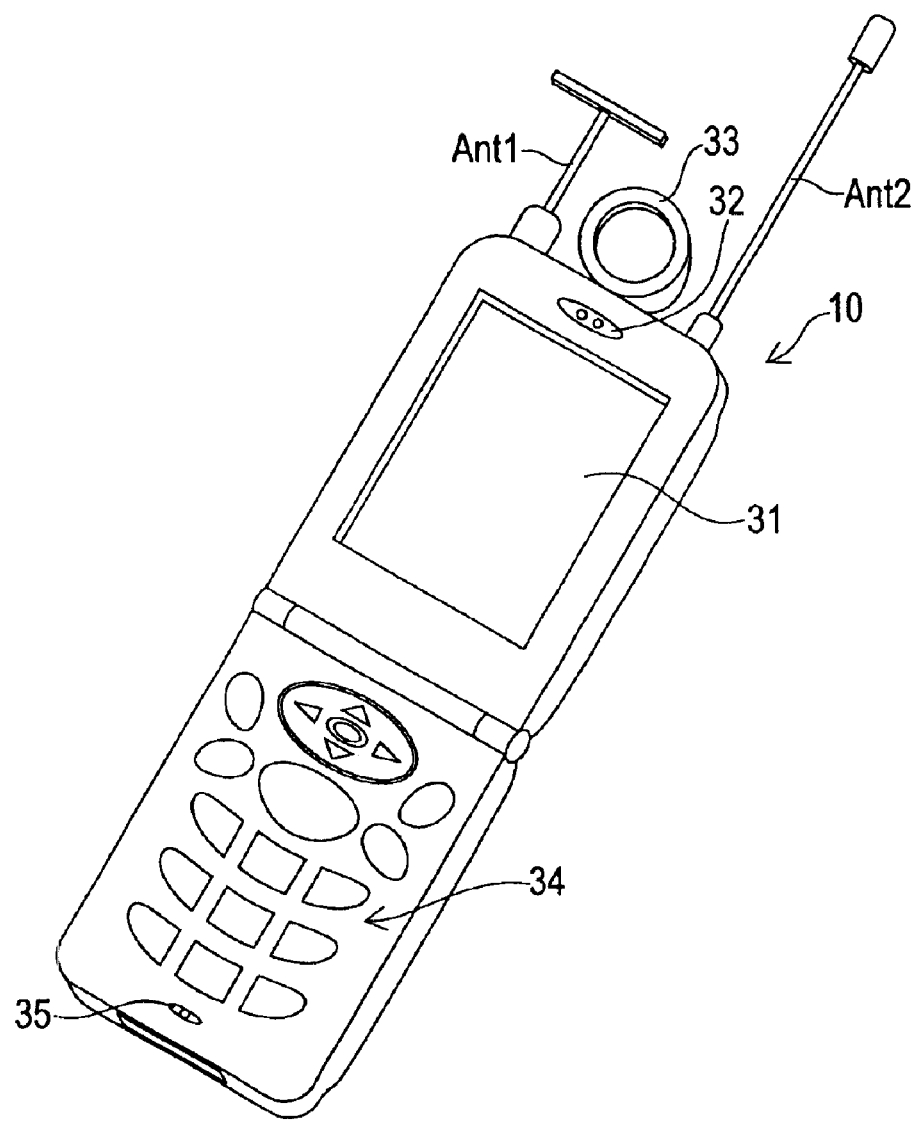
FIG. 3 is a perspective view depicting a configuration appearance example of the portable communication terminal in FIG. 2.

FIG. 3 is a perspective view depicting a configuration appearance example of the portable communication terminal 10 in FIG. 2.

Referring to FIG. 3, this portable communication terminal 10 is comprised of a GPS antenna Ant 1, antenna for radio communication Ant 2, liquid crystal display (LCD) 31, speaker 32, photographic optical system 33, keys 34 and microphone 35. (For operation of each section of the portable communication terminal 10, see the description of FIG. 4, and this portable communication terminal 10 corresponds to the information transfer means in the present invention (claims)).

Figure 4:
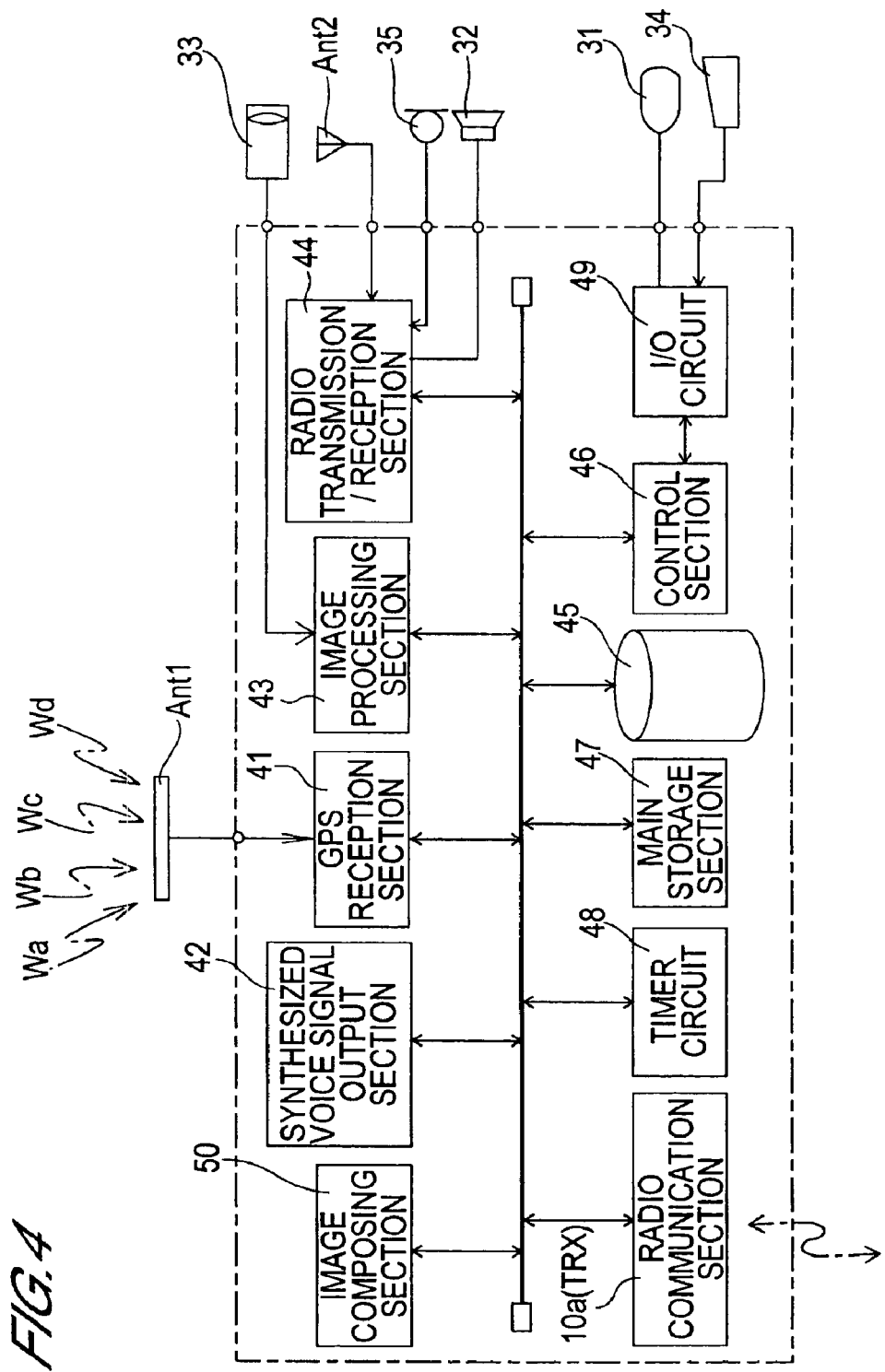
FIG. 4 is a block diagram depicting an electrical configuration example of the portable communication terminal in FIG. 2 and FIG. 3.

FIG. 4 is a block diagram depicting an electrical configuration example of the portable communication terminal 10 in FIG. 2 and FIG. 3. In FIG. 4, composing elements the same as FIG. 3 are denoted with the same reference numerals.

Figure 9:
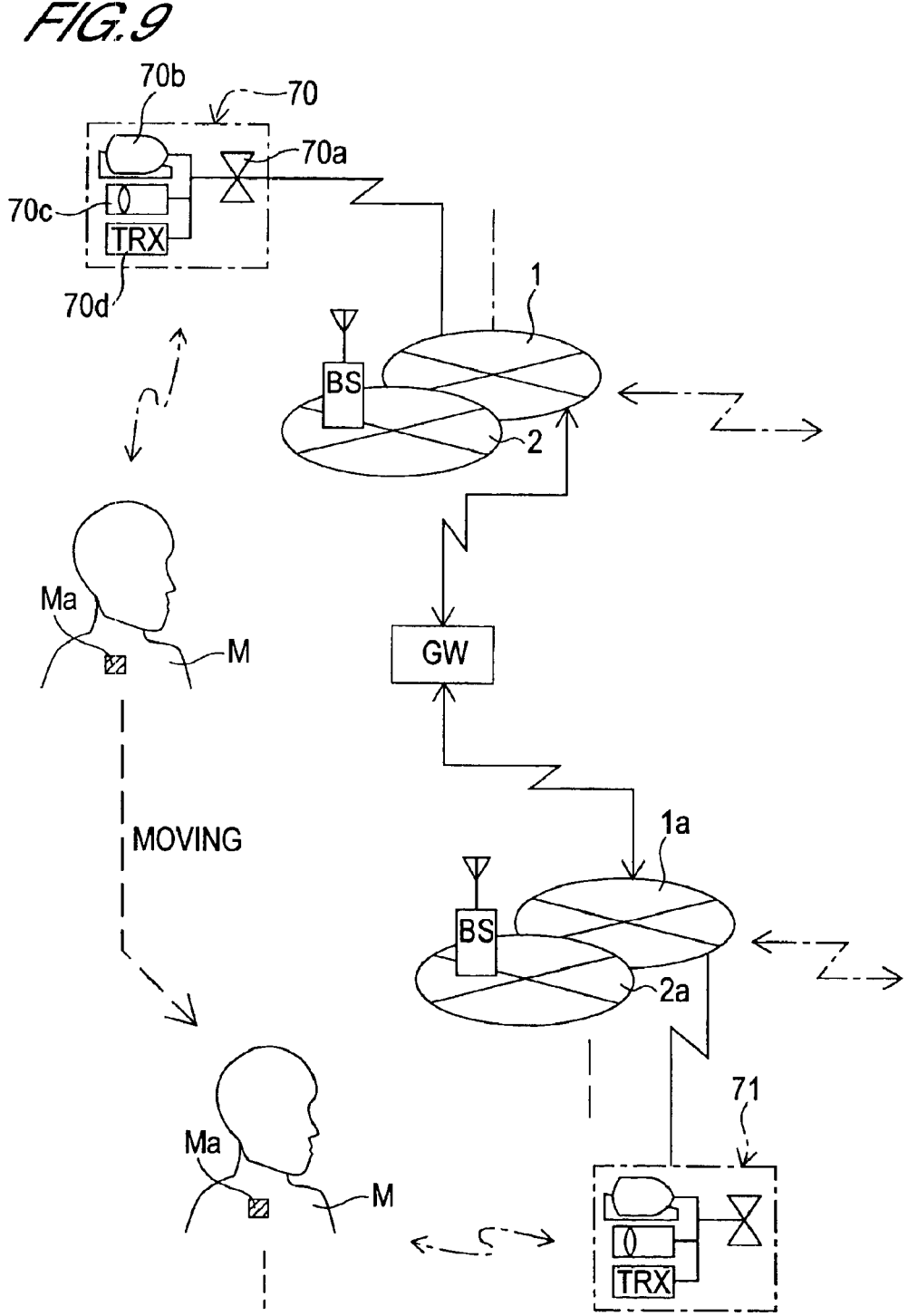
FIG. 9 is a bidirectional communication network diagram depicting a configuration example of the key components of the second embodiment.
Figure 13:
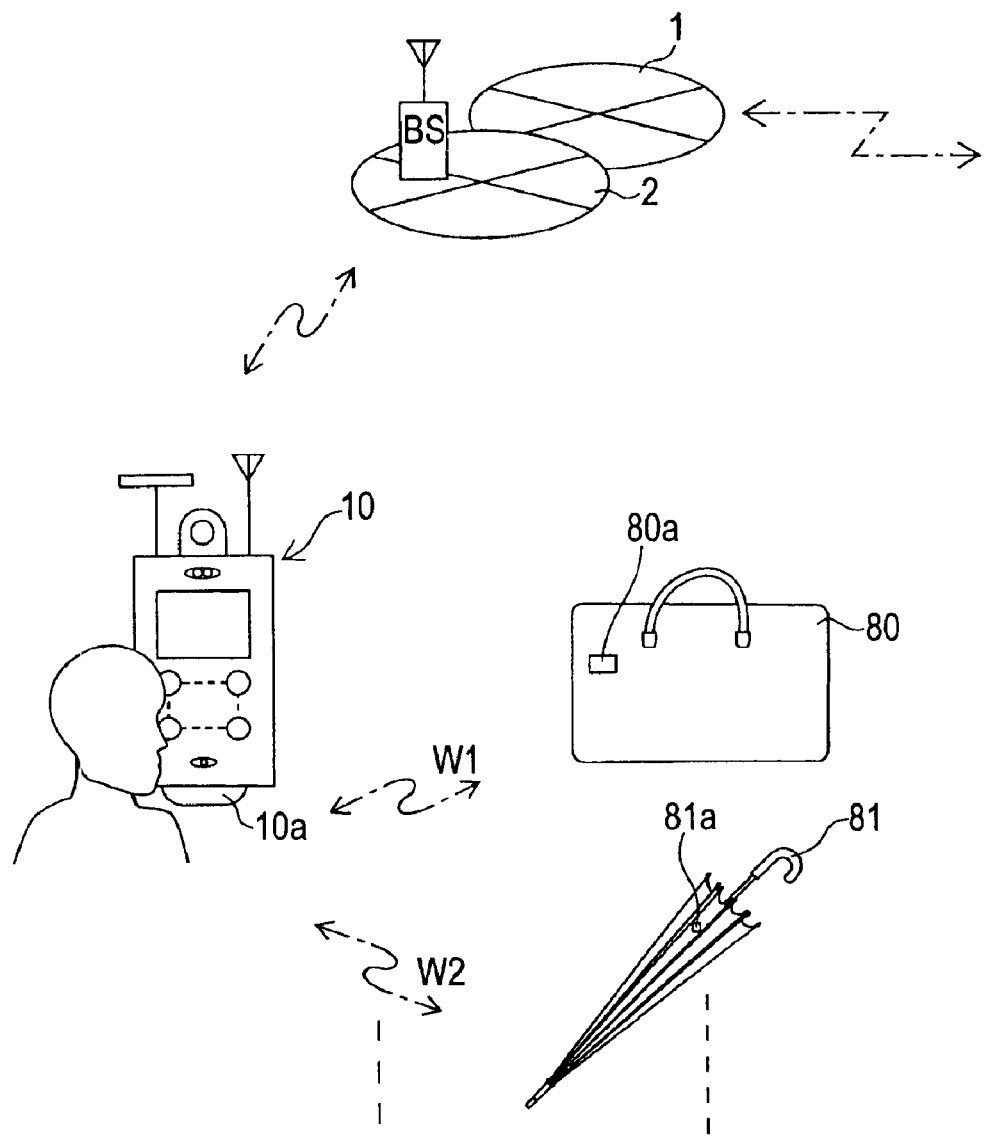
FIG. 13 is a bidirectional communication network diagram depicting a configuration example of the key components of the third embodiment.

Referring to FIG. 4, this portable communication terminal 10 is comprised of the GPS antenna Ant 1, antenna for radio communication Ant 2, liquid crystal display (LCD) 31, speaker 32, photographic optical system 33, keys 34, microphone 35, GPS reception section 41, synthesized voice signal output section 42, image processing section 43, radio transmission/reception section 44, auxiliary storage device 45, control section 46, main storage section 47, timer circuit 48, input/output (I/O) circuit 49, image composition section 50, and radio communication section 10a (TRX 70d in FIG. 9, see also FIG. 13, (the radio communication section 10a corresponds to the radio communication means in the present invention (claims)).

The GPS antenna Ant 1 receives GPS radio waves Wa–Wc or Wa–Wd from at least three or four GPS satellites SS, which are airborne respectively.

The antenna for radio communication Ant 2 is for radio transmission/reception with the radio communication network 2 in the radio block.

The liquid crystal display (LCD) 31 displays various information, especially the above mentioned memory support information and the input information, on the screen.

The speaker 32 is for reception of the portable telephone, and outputs the above mentioned memory support information by voice.

The photographic optical system 33 outputs photographic image signals of the surroundings which are viewed by the individual carrying the portable communication terminal 10.

The keys 34 are for inputting information to the portable telephone (e.g. telephone numbers, power ON/OFF, text input).

The microphone 35 is for transmission of the portable telephone, and for inputting memorandums.

The GPS reception section 41 calculates the absolute position information (two-dimensional information/latitude, longitude, or three-dimensional information/latitude, longitude, altitude) from the reception signals of the GPS radio waves (Wa–Wc/two-dimensional absolute position information, Wa–Wd/three-dimensional absolute position information). This calculation is performed by positional calculations, moving speed and azimuth calculations based on spectral inverse diffusion, distance measurements, Doppler measurement and orbit data processing.

The synthesized voice signal outputting section 42 converts text data and other data into synthesized voice signals, and outputs the synthesized voice signals to the speaker 32.

The image processing section 43 compresses the photographed data from the photographic optical system 33, to be transferred to the communication network side equipment 3, for example, or decompresses the image data received from the communication network side equipment 3, to be displayed on the liquid crystal display 31.

The radio transmission/reception section 44 performs radio transmission/reception processing (e.g. radio transmission/reception, time division multiplexing, encoding/decoding) based on time division multiple access (TDMA), for example.

The auxiliary storage device 45 is an ultra compact hard disk, for example.

The control section 46 executes control of each section of the portable communication terminal 10.

The main storage section 47 is a semiconductor memory, for example, and stores various processing data.

The timer circuit 48 counts the month, day and time, and adds this data to the information of the moving location of the individual carrying the portable communication terminal 10 by GPS reception, for example. Also the timer circuit 48 adds month, date and time data to the talk (conversation) content of the portable telephone, photographic image data (compressed data) and text data (e.g. Internet connection by portable telephone), and stores the data in the information collection D/B system 23.

The radio communication section 10a executes radio communication with a radio chip (IC chip with no power supply, corresponds to the non-contact storage element in the present invention (claims)). (The radio communication section 10a and radio communication thereof will be described in the second embodiment.)

The image composing section 50 comprises a V-RAM and performs image composing processing for displaying an absolute position on a map.

Here GPS is used for generating the absolute position information, but other magnetic sensors can operate in the same way.

Figure 5:
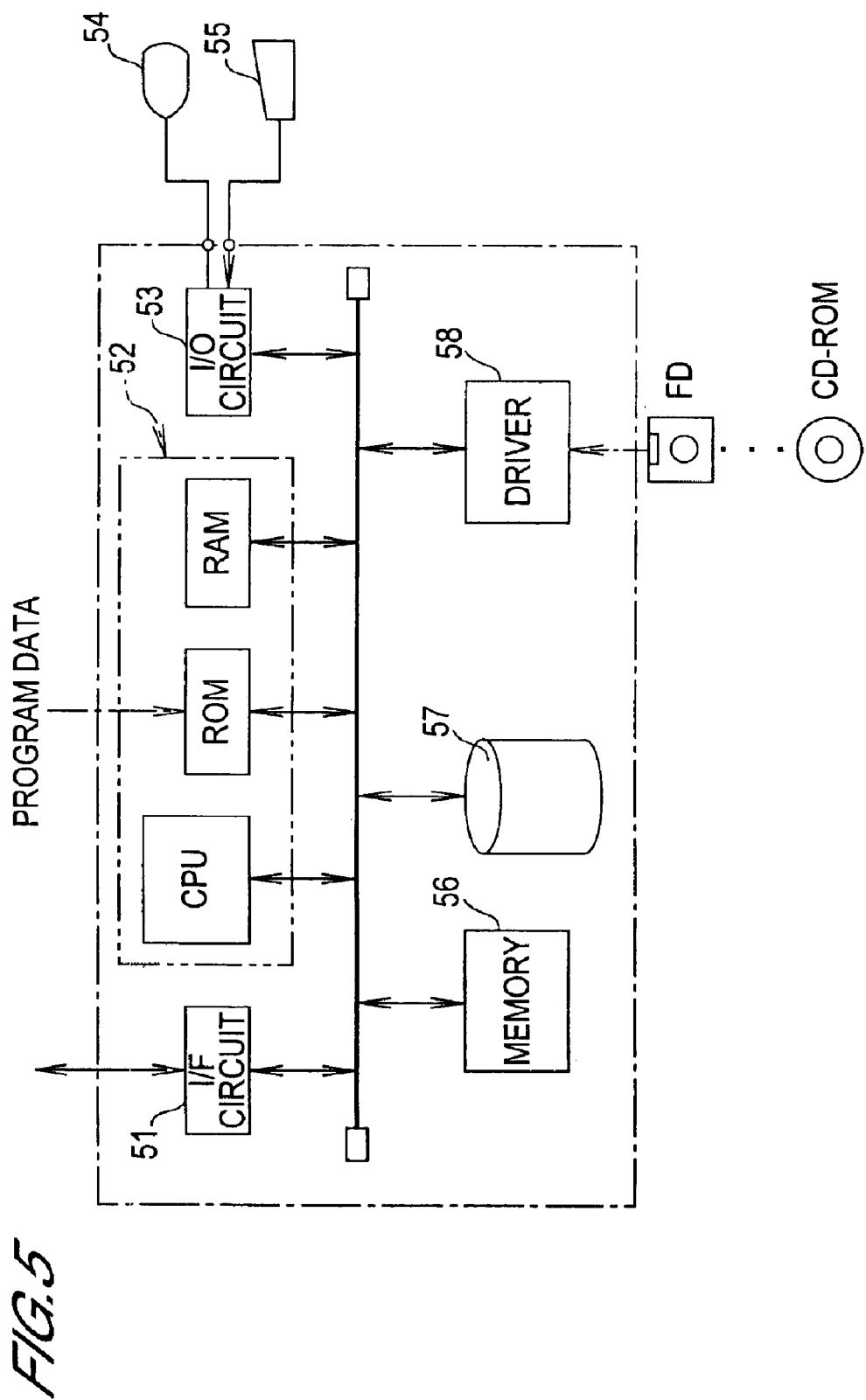
FIG. 5 is a block diagram depicting the control system for executing the programs stored in the information recording medium in each equipment in FIG. 2.

FIG. 5 is a block diagram depicting the control system for executing the programs stored in the information recording medium in each equipment in FIG. 2.

Referring to FIG. 5, this configuration example is comprised of the I/F circuit 51, MPU 52 (CPU and RAM and ROM for operation), input/output (I/O) circuit 53, display device 54, input operation device 55, memory 56, auxiliary storage device 57 and driver 58.

The configuration example of this control system operates as follows via the bus line for control and transferring of addresses and data.

The I/F circuit 51 performs data transfer processing and processes transfer data so that the MPU 52 can load it. The MPU 52 comprises a CPU, RAM and ROM for operation, and executes known processing. The input/output (I/O) circuit 53, outputs the various processing data to the display device 54, such as a CRT and LCD, and exchanges data with the input operation device 55, which is implemented by keyboard and mouse for inputting various information.

In the configuration in FIG. 5, processing data of the MPU 52 is stored in the memory 56 and auxiliary storage device 57, so that the driver 58 loads the stored information from such information recording media as CD-ROM.

(General Operation of First Embodiment)

Figure 6:
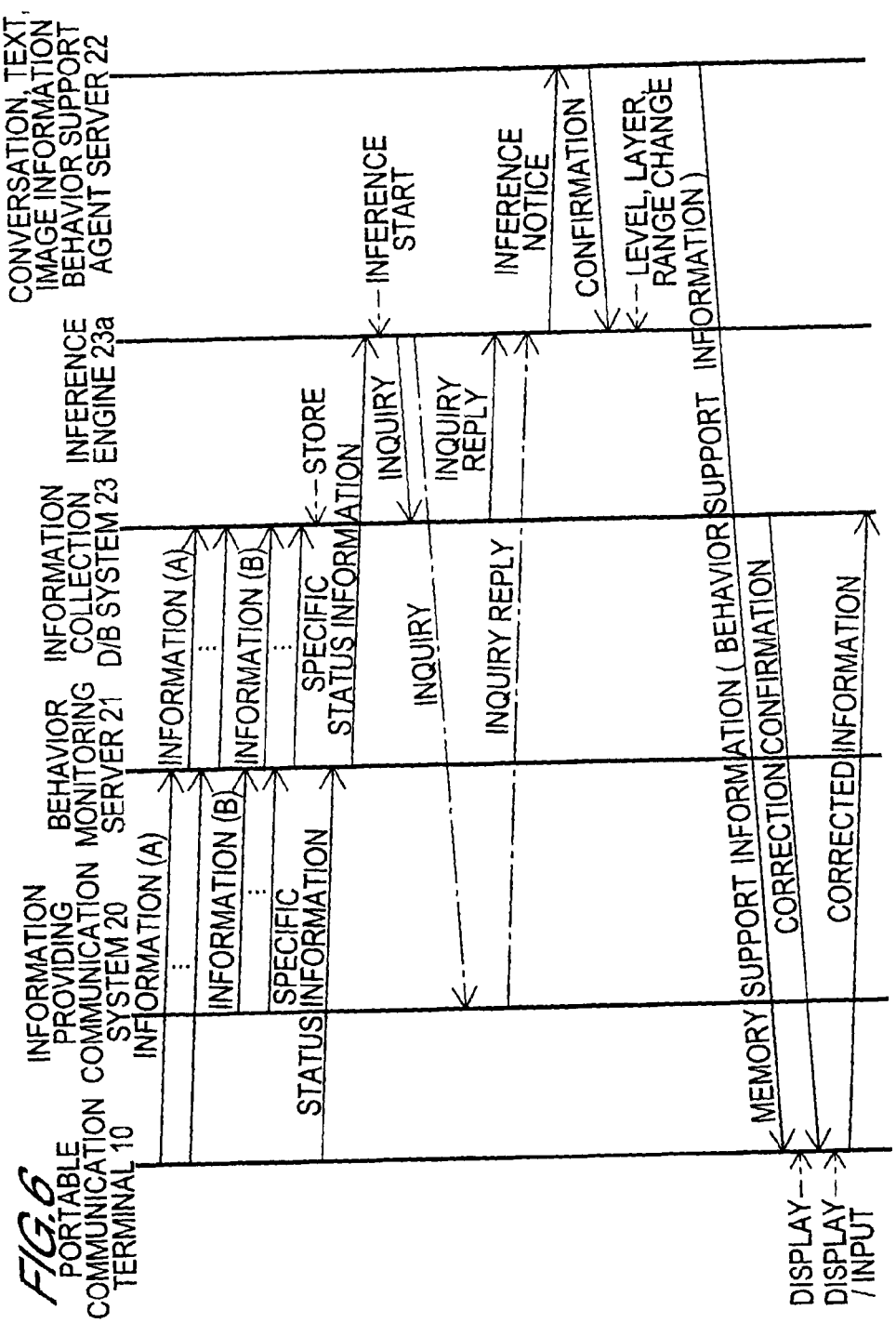
FIG. 6 is a sequence diagram of the first embodiment.
Figure 7:
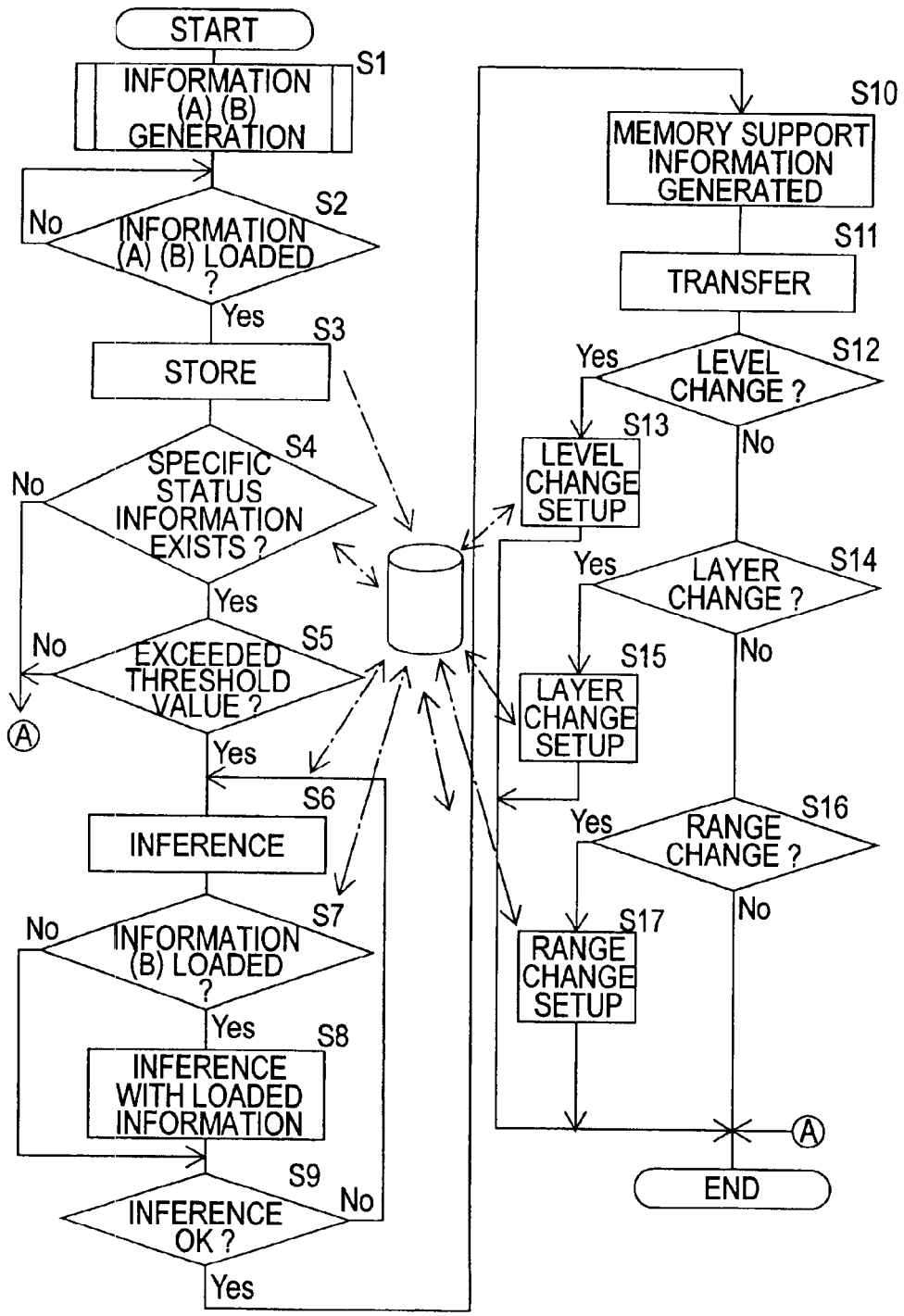
FIG. 7 is a flow chart depicting the processing procedure of the operation of the first embodiment.

FIG. 6 is a sequence diagram of the first embodiment, and FIG. 7 is a flow chart depicting the processing procedure of the operation of the first embodiment.

In FIG. 7, the processing procedure is described regarding the behavior monitoring server 21 and the behavior support agent server 22 in FIG. 2 as one control system.

Referring to FIG. 2 to FIG. 5 and FIG. 6 and FIG. 7, the portable communication terminal 10, which the individual who has problems with memory always carriers, generates the following information (a) to (e) of (A).

(A):(a) absolute self position (two-dimensional or three-dimensional) information measured by GPS at a predetermined interval;

(b) input information (e.g. schedule management information and recorded memorandums);

(c) information of portable telephone (conversation) via radio block;

(d) information of text information communication (Internet connection via portable telephone);

(e) image information on surroundings photographed intermittently (continuously in some cases).

In the above mentioned (c) information of the portable telephone (conversation) via a radio block, the conversation content of the individual carrying the portable communication terminal 10 in particular is judged by voice recognition (natural language), and is converted into text data and is stored in the information collection D/B system 23, for example. Voice recognition (natural language) uses such well known methods as phoneme recognition, single syllable recognition, word recognition and sentence recognition.

It is preferable to compress (e) image information on surroundings photographed intermittently (continuously in some cases) by MPEG (Moving Picture Experts Group) processing, and store it relative to the storage capacity, in the information collection D/B system 23. Text sections of image information are cut out, and these text sections are converted into text data by an optical character reader, are added to the image information, and are stored in the information collection D/B system 23.

Along with the information (A) from (a) to (e), various information (B) in the map information providing system, traffic information providing system and weather information providing system in the information providing communication system 20 are generated for inference by the inference engine 23a (step S1).

The information (A) and (B) are transferred to the communication network side equipment 3 along with the identification code (ID) of the individual carrying the portable communication terminal 10 (individual having problems with memory), and loading of the behavior monitoring information thereof is judged by the behavior monitoring server 21 (step S2), then the information (A) and (B) are stored in the information collection D/B system 23 (step S3).

The behavior monitoring server 21 judges the presence of specific status information of the individual carrying the portable communication terminal 10 in the behavior monitoring of the above information (A) (step S4). When the behavior monitoring server 21 loads the specific status information here, the inference engine 23a starts up, and performs inference for the specific status information, that is, it is judged what kind of "memory support information (behavior support information)" is required by the individual carrying the portable communication terminal 10 (individual who has problems with memory) in the specific status. For this judgment, the behavior monitoring server 21 judges whether the time, when "(a) absolute self position (two-dimensional or three-dimensional) information measured by GPS at a predetermined interval" in the information (A), does not change, and whether time exceeds a predetermined time (threshold value) (step S5). If this time, when the information does not change, exceeds a predetermined time (threshold value), this means that the individual has become lost and is standing still. In the case of such an incident occurring at a train station, however, the individual may be stopping to purchase a ticket or is waiting to meet someone.

In this status, the inference engine 23a starts inference on what kind of "memory support information" the individual carrying the portable communication terminal 10 (individual who has problems with memory) requires (step S6).

In this inference, the map information in the information (B) is loaded (step S7), and the current position (e.g. train station) of the individual carrying the portable communication terminal 10 is specified from the current two-dimensional (or three-dimensional) absolute position information (see (a) in information (A)) stored in the information collection D/B system 23. And information from "(b) input information (e.g. schedule management information and recorded memorandums) to (e) image information on surroundings photographed intermittently (continuously in some cases)" in the above information (A) stored in the information collection D/B system 23 are referred to for inference.

In this way, inference for the specific status information is performed (step S8). And if the conclusion of inference cannot be obtained (step S9), processing returns to step S8, and subsequent processing is repeated for further inference. For example, when the specific status information exceeds a predetermined threshold time, that is, in standing status, information, from "(b) input information (e.g. schedule management information and recorded memorandums) to (e) image information on surroundings photographed intermittently (continuously in some cases)" in the above information (A), is retrieved and inferred, and the result of "standing status" at this time and data and at this location (e.g. train station) may not be obtained. In this case, the behavior support agent server 22 inquires to the individual carrying the portable communication terminal 10 (that is, the individual in "standing status") by synthesized voice (or text information or image information) (this is not indicated in FIG. 6 and FIG. 7) for a reply.

By this inquiry, the inference engine 23a knows the reply from the portable communication terminal 10 side, such as "I don't know the short cut to the North Exit of the station I used to take".

Here the inference engine 23a loads the passage information of this "train station" from the map information providing system of the information providing communication system 20, generates a reply corresponding to the lost memory information "I don't know the short cut to the North Exit of the station I used to take" (memory support information/behavior support information, for example, with "Take the passage at the right, and turn left at the kiosk, then you come to the North Exit") (step S10), and transfers this reply to the portable communication terminal 10 via the behavior support agent server 22 (step S11).

In this inference, the reply corresponding to the lost memory information "I don't know the short cut to the North Exist of the station I used to take" is acquired from the map information, but also can acquire a similar reply by inference by using "(a) absolute self position (two-dimensional or three-dimensional) information measured by GPS at a predetermined interval" in the information (A) of the past.

The portable communication terminal 10 outputs the reply from the behavior support agent server 22 of the communication network side equipment 3 by voice, and displays it by text on a screen, so that the individual carrying (the portable communication terminal 10 can complement the personal lost memory information with communication, and can take appropriate action.

In this inference, only the map information of the map information providing system is referred to in order to acquire a reply corresponding to the lost storage information "I don't know the short cut to the North Exit of the station I used to take", but when other replies are required, information of the traffic information providing system and weather information providing system in the information providing communication system 20 are referred to.

In this inference, inference is executed regarding the above mentioned (a) daily forgetfulness, (b) weakening of memory due to aging, and (c) disorders of memory due to brain injury and dementia as "level 1, 2 and 3", the hierarchy of the memory support information (behavior support information as "layer 1 . . . n", and the generation range of the memory support information (behavior support information) as "range 1 . . . n".

"Level 1, 2 and 3 are the degree of the memory problem.

"Layer 1 . . . n" is the quantity of memory support information (behavior support information) with respect to the above mentioned degree of memory problem, in other words, the depth of description (quantity of description). This is the quantity of description for each "level 1, 2 and 3", and the memory support information (behavior support information) increases as the level increases.

"Range 1 . . . n" is a range of the memory support information (behavior support information) with respect to the above mentioned degree of memory problem. In other words, "range 1 . . . n" is a range of description to the individual who has problems with memory, and the range of description (memory support information/behavior support information) does not increase as the "level 1, 2 and 3" increase. This is because in the case of (c) disorder of memory due to brain injury and dementia in "level 3" for example, increasing the memory support information (behavior support information) makes it difficult for the individual who has problems with memory (see the above mentioned (c)) to understand the memory support information (behavior support information) instantaneously, and the specific status where the individual who lost memory cannot take an action to be performed next cannot be dispelled on the spot (behavior support to the individual who has problems with memory becomes uncertain).

"Level 1, 2 and 3", "layer 1 ... n", and "range 1 ... n" are manually set at first, but are changed and set so that optimum behavior support information for the specific status information can be provided (steps S12, S13, S14, S15, S16, S17). For example, "levels 1, 2 and 3", "layer 1 ... n", and "range 1 ... n" are non-periodically and automatically changed and set for each individual who has problems with memory, depending on the length of time for which the individual is standing due to becoming lost, and the conversation status between the individual who has problems with memory and the "conversation, text and image information behavior support agent", and are applied to the next behavior support.

In other words, memory support information to dispel the specific status is generated for each individual who has problems with memory according to the degree of the memory problem and the specific status, such that the memory support information matches the situation.

The memory support information (behavior support information) generated in this way is transferred to the individual carrying the portable communication terminal 10.

In the status where the individual cannot take an action to be performed next continues after this transfer, that is, if the specific status information is transferred again (e.g. the case when the path to take remains unclear), then the setting of "level 1, 2 and 3", "layer 1 ... n" and "range 1 ... n", which were initially set individually by manual operation, is automatically changed. And more detailed memory support information is transferred.

In the above mentioned information collection, the individual carrying the portable communication terminal 10 and the operator (administrator) of the complementary bidirectional communication network, based on the communication of personal lost memory information to the individual who has problems with memory, can check and correct the content of the settings whenever necessary.

In this way, the information provisions for dispelling the specific status where the individual who lost memory cannot take an action to be performed next can be provided on the spot by inference, personally and instantaneously, with certainty, and behavior support for the individual who has memory problems becomes possible with certainty.

By this memory support information (behavior support information), the individual carrying the portable communication terminal 10 can complement the lost memory and the status where the individual who lost memory cannot take an action to be performed next can be dispelled.

(Advantages of First Embodiment)

In this way, in the first embodiment, information provisions for dispelling the specific status where the individual who lost memory cannot take an action to be performed next on the spot can be provided with certainty by inference, personal and instantaneously. As a result, appropriate behavior of the individual who has problems with memory and behavior support thereof become possible with certainty.

(Basic Functions of Second Embodiment)

Figure 8:
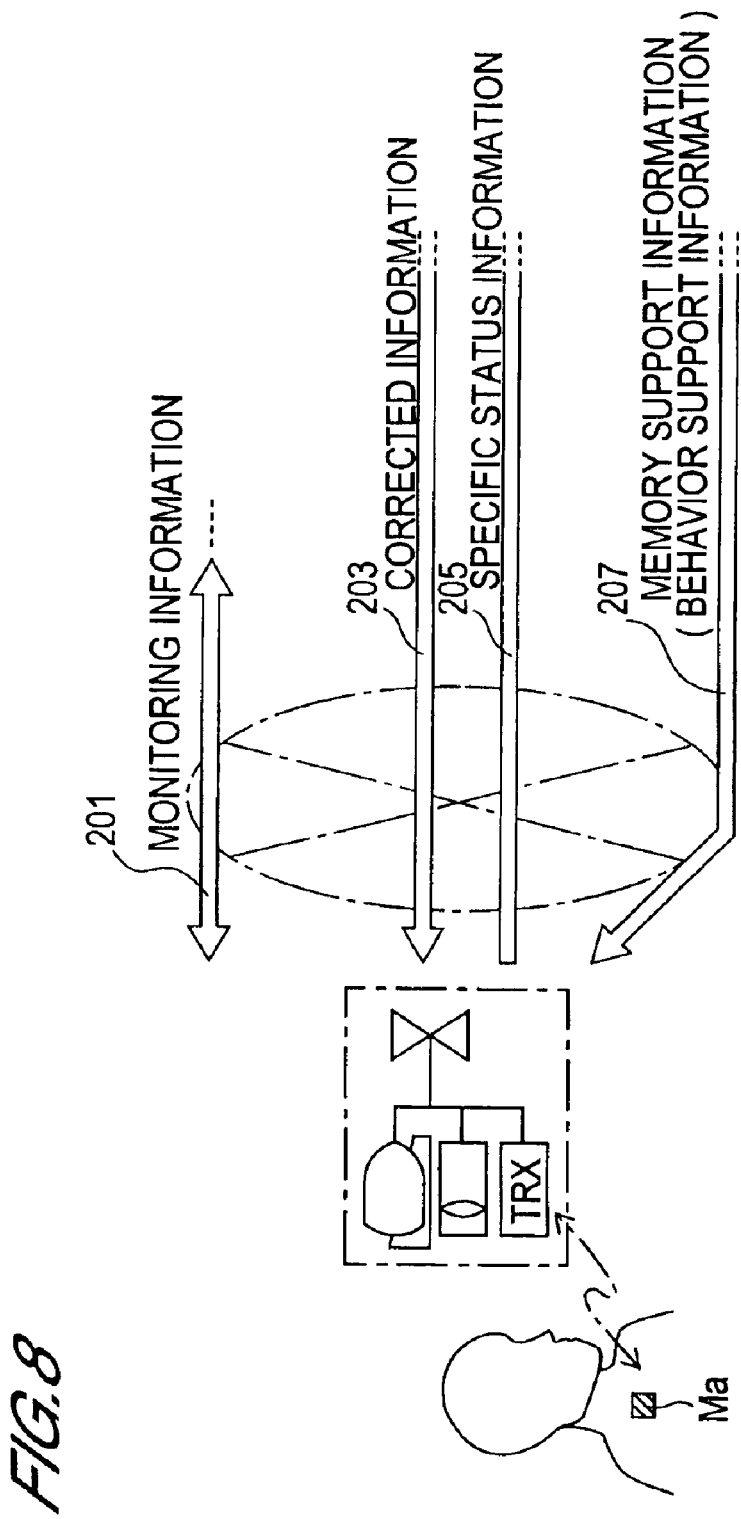
FIG. 8 is a diagram depicting the functions of the second embodiment.

FIG. 8 is a diagram depicting the functions of the second embodiment.

Referring to FIG. 8, an individual who has problems with memory does not carry the portable communication terminal 10 used in the first embodiment, and "appropriate behavior of the individual who has problems with memory and behavior support thereof", similar to the first embodiment, is executed.

The individual who has problems with memory attaches a radio chip Ma, where an identification code (ID) for each individual who has problems with memory is stored in the internal integration circuit, to their clothes, and performs daily life activity (moving), and the fixed terminal connected to a cable communication network detects the identification code (ID) of each individual who has problems with memory by radio at each point of the locations moved through. The fixed terminal functions in the same way as the portable communication terminal 10 of the first embodiment.

In other words, a public telephone and a photographic camera connected thereto transfers the content of talk and the photographed images of the surroundings of the individual who has problems with memory, along with the identification code (ID), to indicate the installed location of the fixed terminal, and also transfers the date and time data. The display connected to the public telephone displays various information, in particular the above mentioned memory support information 207 and input information from the individual who has problems with memory on a screen.

Now the means of implementing the basic functions of the second embodiment will be described.

(Configuration and Individual Operation of Key Components of Second Embodiment)

FIG. 9 is a bidirectional communication network diagram depicting a configuration example of the key components of the second embodiment.

Referring to FIG. 9, the second embodiment comprises a radio chip Ma which the individual M who has problems with memory attaches to their clothes, a fixed terminal 70 (corresponds to the fixed communication terminal in the present invention (claims)) connected to the cable communication network 1, and a fixed terminal 71 (corresponds to the fixed communication terminal in the present invention (claims)) connected to the cable communication network 1a, which is connected to the cable communication network 1 via the gateway (GW), so as to detect the stored information of the radio chip Ma at the moving destination of the individual M who has problems with memory.

The fixed terminal 70 is comprised of a public telephone 70a, input operation section/display 70b, photographic camera 70c, and radio transmission section 70d (TRX, corresponds to the radio communication section 10a in FIG. 4). The fixed terminal 71 also has a similar configuration (reference numerals are omitted).

The configuration of the communication network side equipment 3 and other components are the same as the first embodiment shown in FIG. 2, so illustration and description thereof are omitted.

Now the individual operation of the above mentioned key components will be described.

The radio chip Ma stores the identification code (ID) of each individual M who has problems with memory in a 5 mm square internal integrated circuit, for example, with no power supply/no battery, and operates using an electromotive force of the internal antenna which receives intermittently read radio waves from the fixed terminal 71 as the power supply.

The radio block between the radio chip Ma and the fixed terminal 71 is the radio communication connection of Bluetooth and IrDA, for example.

The public telephone 70a of the fixed terminal 70 (71) executes communication with the communication network side equipment 3 via the cable communication network 1. The public telephone 70a stores the absolute self position information (corresponds to the absolute position information of GPS measurement in the first embodiment), and transfers the absolute self position information to the communication network side equipment 3 as the behavior monitoring information.

The input operation section/display 70b is used for the individual M who has problems with memory to transfer various information (for example, schedule management information and recorded memorandums) to the communication network side equipment 3 as behavior monitoring information.

The photography camera 70c transfers the photographed images of surroundings to the communication network side equipment 3 as behavior monitoring information.

The radio transmission section 70d constantly monitors the movement of the radio chip Ma in the service area, detects the identification code (ID) for each individual M who has problems with memory during this monitoring, and transfers the identification code to the communication network side equipment 3 via the public telephone 70a which is automatically started up by this detection.

In this way, the fixed terminal 70 (71) transfers each information from (a) absolute self position (two-dimensional or three-dimensional) information measured at a predetermined interval to (e) image information on surroundings photographed intermittently (continuously in some cases), described in the first embodiment, along with the identification code (ID) of the individual carrying the portable communication terminal 10 (individual who has problems with memory).

The cable communication networks 1 and 1a and the fixed terminals 70 and 71 are installed in a range where the individual M who has problems with memory moves, such as throughout Japan (constructed as a communication network).

(General Operation of the Second Embodiment)

Figure 10:
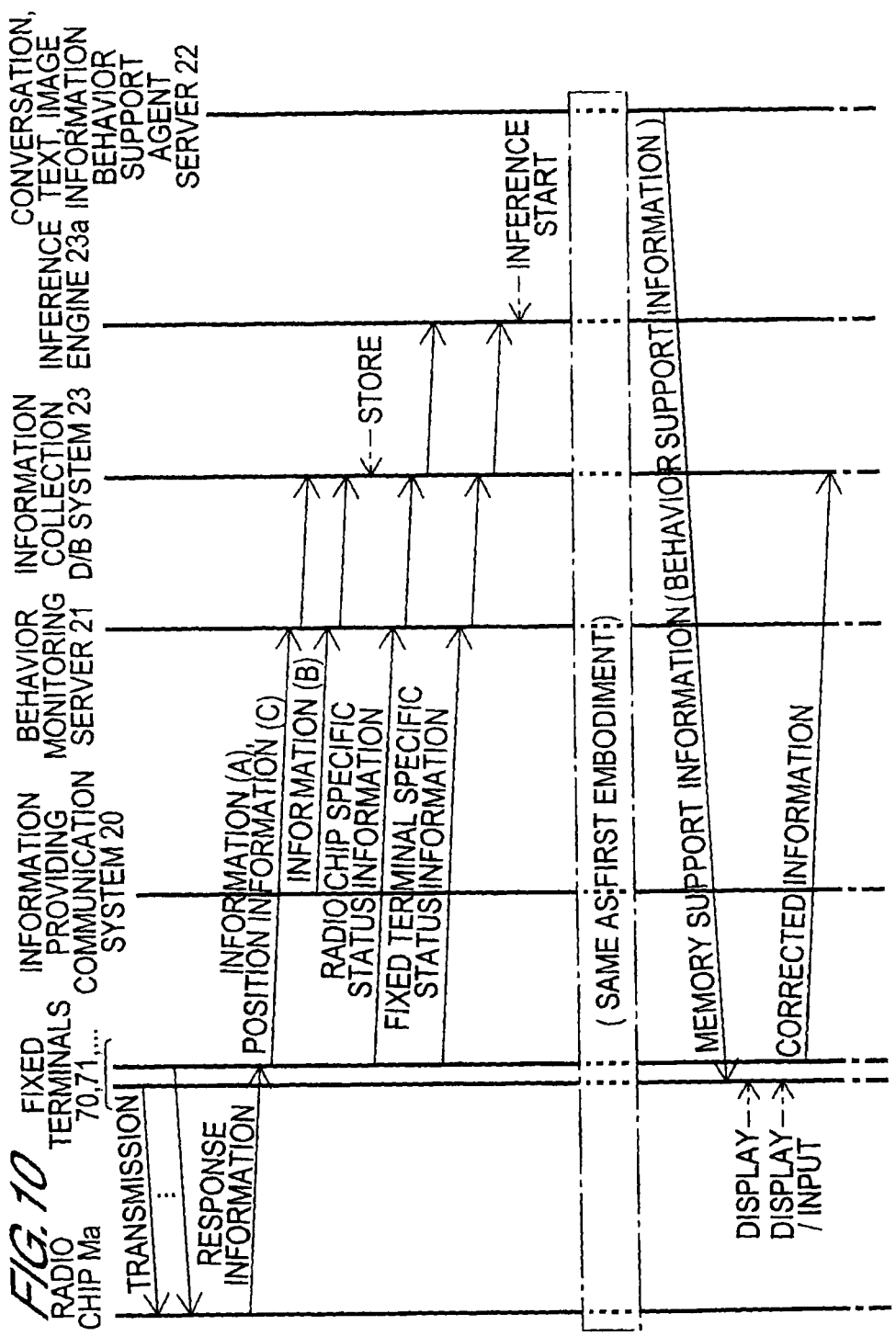
FIG. 10 is a sequence diagram of the second embodiment.
Figure 11:
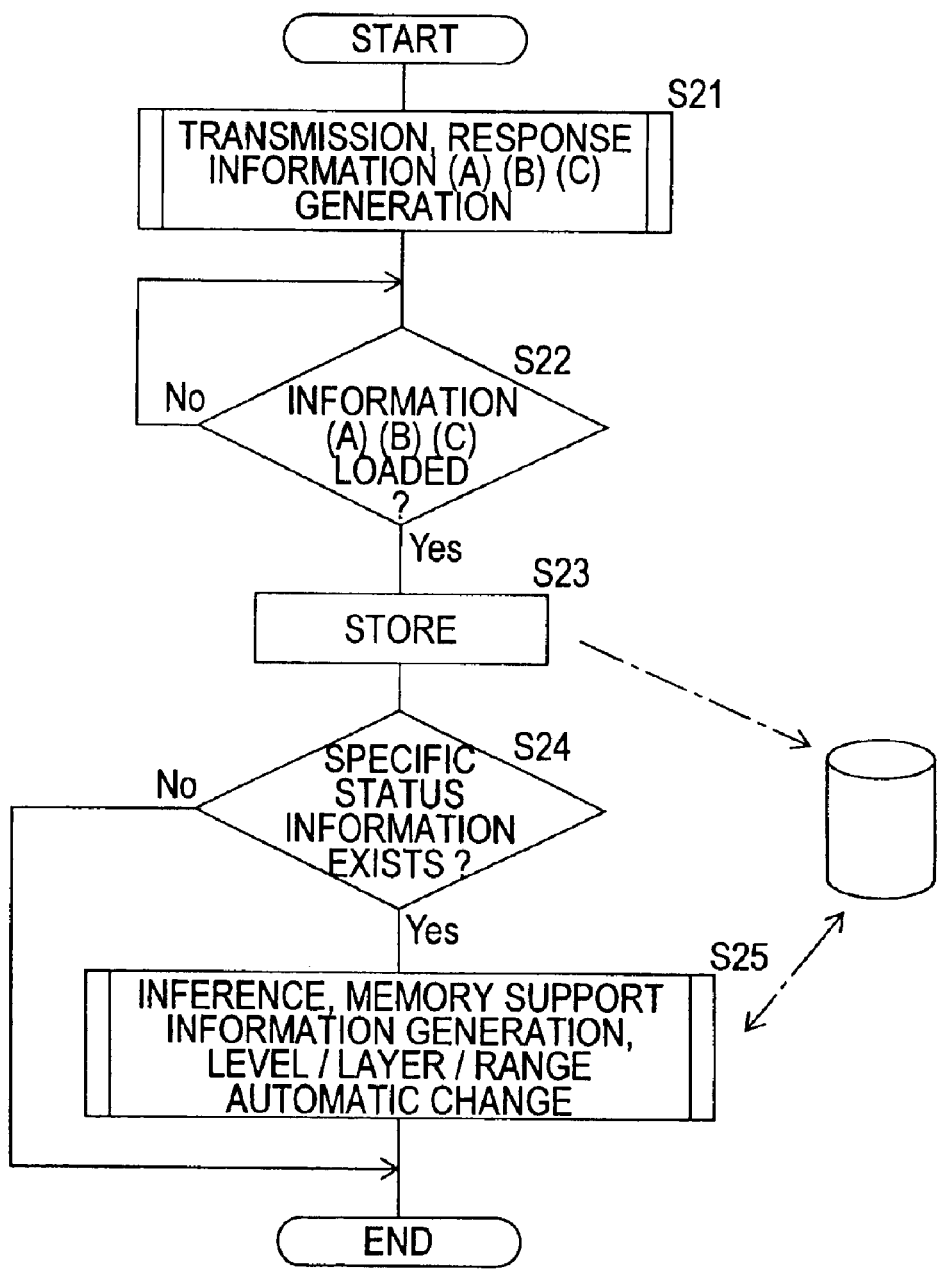
FIG. 11 is a flow chart depicting the processing procedure of the operation of the second embodiment.

FIG. 10 is a sequence diagram of the second embodiment. FIG. 11 is a flow chart depicting the processing procedure of the operation of the second embodiment.

In FIG. 11, the processing procedure is described regarding the behavior monitoring server 21 and the behavior support agent server 22 in FIG. 2 as one control system.

Referring to FIG. 9 to FIG. 11, the individual who has problems with memory attaches the radio chip Ma, which stores the identification code (ID) for each individual who has problems with memory in the internal integrated circuit, to their clothes and performs daily life activities (moving). At each point of the moving location, the fixed terminals 70 and 71, connected to the cable communication network 1, detect the identification code (ID) of the individual who has problems with memory by radio.

The fixed terminals 70 and 71 function in the same way as the portable communication terminal 10 of the first embodiment. In other words, the public telephone 70a and the photographic camera 70c connected thereto transfer the content of talk and the photographed images of the surroundings of the individual who has problems with memory, along with the identification code (ID), to indicate the installation locations of the fixed terminals 70 and 71, and the date and time data. The input operation section/display 70b connected to the public telephone 70a displays various information, particularly the above mentioned memory support information and the input information from the individual who has problems with memory on the screen.

Such information (A), that is, information equivalent to information from the above mentioned (a) absolute self position (two-dimensional or three-dimensional) information measured by GPS at a predetermined interval to (e) image information on the surroundings photographed intermittently (continuously in some cases), and the position information (c) of the fixed terminals 70 and 71 are generated, and are transferred to the behavior monitoring server 21 of the communication network side equipment 3. Also in the information providing communication system 20, various information (B) at the map information providing system, traffic information providing system, and weather information providing system of the information providing communication system 20 are generated for inference by the inference engine 23a (step S21). Hereafter processing is the same as the first embodiment.

In other words, the information (A), (B) and (C), along with the identification code (ID) of the individual carrying the portable communication terminal 10 (individual who has problems with memory), are transferred to the communication network side equipment 3, the behavior monitoring server 21 judges whether the behavior monitoring information is loaded (step S22), then the behavior monitoring information is stored in the information collection D/B system (step S23).

Also in the behavior monitoring of the above mentioned information (A), the behavior monitoring server 21 judges the presence of the specific status information of the individual carrying the portable communication terminal 10 (step S24). Hereafter, inference, the generation of memory support information, and the automatic change of level/layer/range are executed (step S25, for details, see the descriptions in steps S5–S16 in FIG. 7 in the first embodiment).

(Advantages of the Second Embodiment)

In this way, in the second embodiment, the individual M who has problems with memory simply attaches the radio chip Ma, that is, without carrying the portable communication terminal 10 which becomes a burden during activity, and appropriate behavior of the individual who has problems with memory and behavior support thereof, similar to the first embodiment, becomes possible with certainty.

(Basic Functions of the Third Embodiment)

Figure 12:
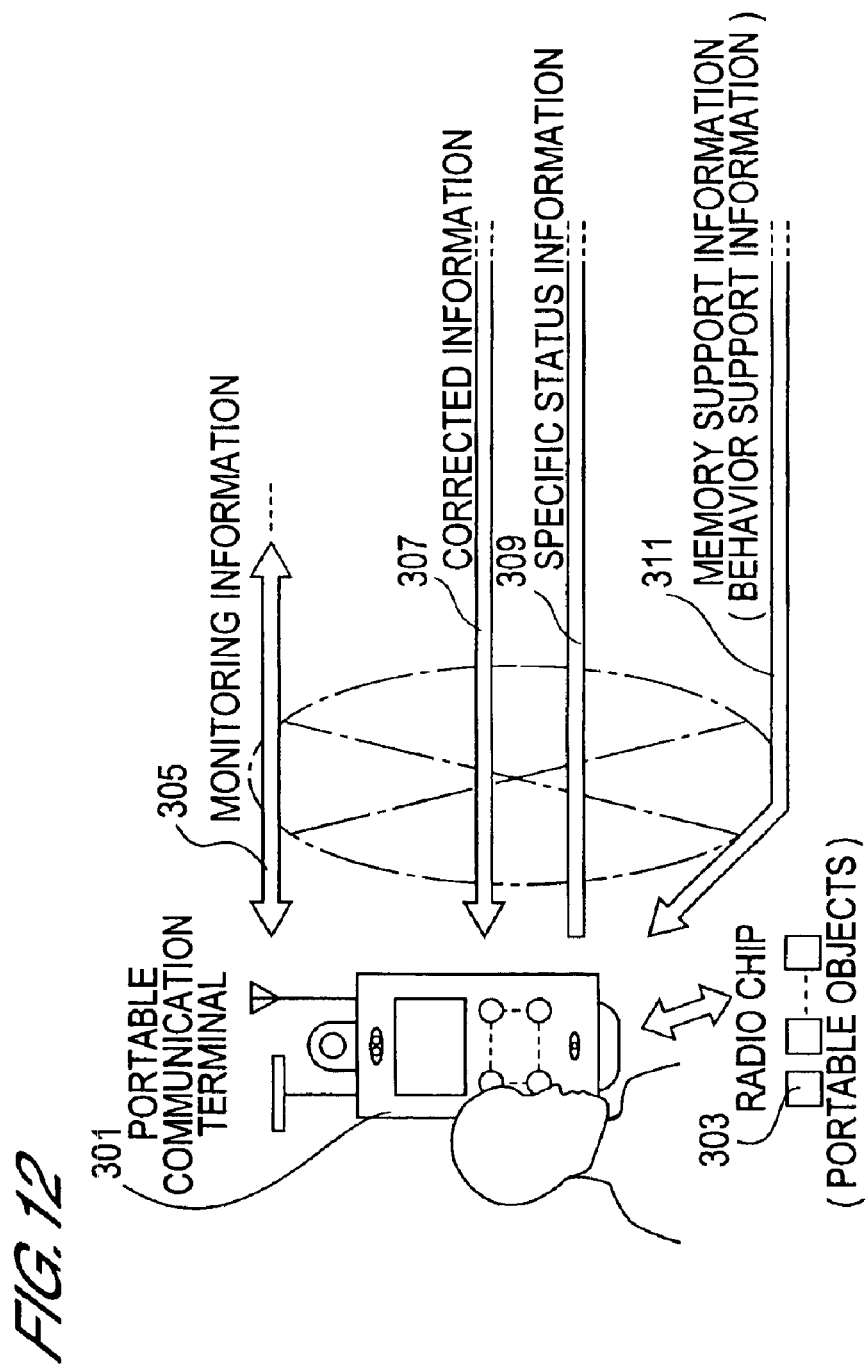
FIG. 12 is a diagram depicting a functional configuration of the third embodiment.

FIG. 12 is a diagram depicting a functional configuration of the third embodiment.

Referring to FIG. 12, in the third embodiment, "appropriate behavior of an individual who has problems with memory and behavior support thereof" is executed just like the first embodiment when the individual who has problems with memory leaves a portable object (e.g. bag, umbrella) behind.

A radio chip 303 is attached to the portable object (e.g. bag, umbrella). And the radio chip 303 stores an identification code (ID) for each portable object and for each individual carrying the portable communication terminal 301 in the internal integration circuit.

Thereafter, the portable communication terminal 301 continuously monitors the radio connection with the radio chip 303, and transfers this monitoring information 305 as behavior monitoring information 305.

When the portable communication terminal 301 detects a decrease or interruption the field strength with the radio chip 303 (this means that the distance between the portable communication terminal 301 and the portable object, where the radio chip 303 is attached, became a predetermined distance or longer), notification that the portable object (e.g. bag, umbrella) was left behind is sent from the portable communication terminal 301 to the individual carrying the portable object (individual who has problems with memory) by this decrease or interruption.

In other words, just like the first embodiment, appropriate behavior of an individual who has problems with memory and behavior support thereof becomes possible with certainty.

Now the means of implementing the basic functions of the third embodiment will be described.

(Configuration and Individual Operation of Key Components of the Third Embodiment)

FIG. 13 is a bidirectional communication network diagram depicting a configuration example of the key components of the third embodiment.

Referring to FIG. 13, the third embodiment comprises a radio communication section 10a installed in the portable communication terminal 10, and radio chips 80a and 81a, which are attached to a bag 80 and umbrella 81 respectively.

Configuration of the communication network side equipment 3 and other components is the same as the first embodiment shown in FIG. 2, so illustrations and descriptions thereof are omitted.

Now the individual operation of the above mentioned key components will be described.

The radio communication section 10a comprises the field strength decision circuit (not illustrated) which detects the individual identification information (ID) of the radio chips 80a and 81a which are attached to the bag 80 and umbrella 81 respectively by a radio communication line, and judges a drop in field strength by comparing it with the threshold value which has been set in advance, or identifies an interruption.

The radio chips 80a and 81a store the individual identification information (ID) of the radio chips 80a and 81a, which are attached to the bag 80 and the umbrella 81 respectively, in the 5 mm square internal integrated circuit, for example, with no power supply/no battery, and operate using the electromotive force of the internal antenna, which received the intermittently read radio waves from the radio communication section 10a, as a power supply of the internal integrated circuit.

The radio blocks W1 and W2 between the radio chips 80a and 81a and the radio communication section 10a are radio communication connections of Bluetooth and IrDA, for example.

(General Operation of the Third Embodiment)

Figure 14:
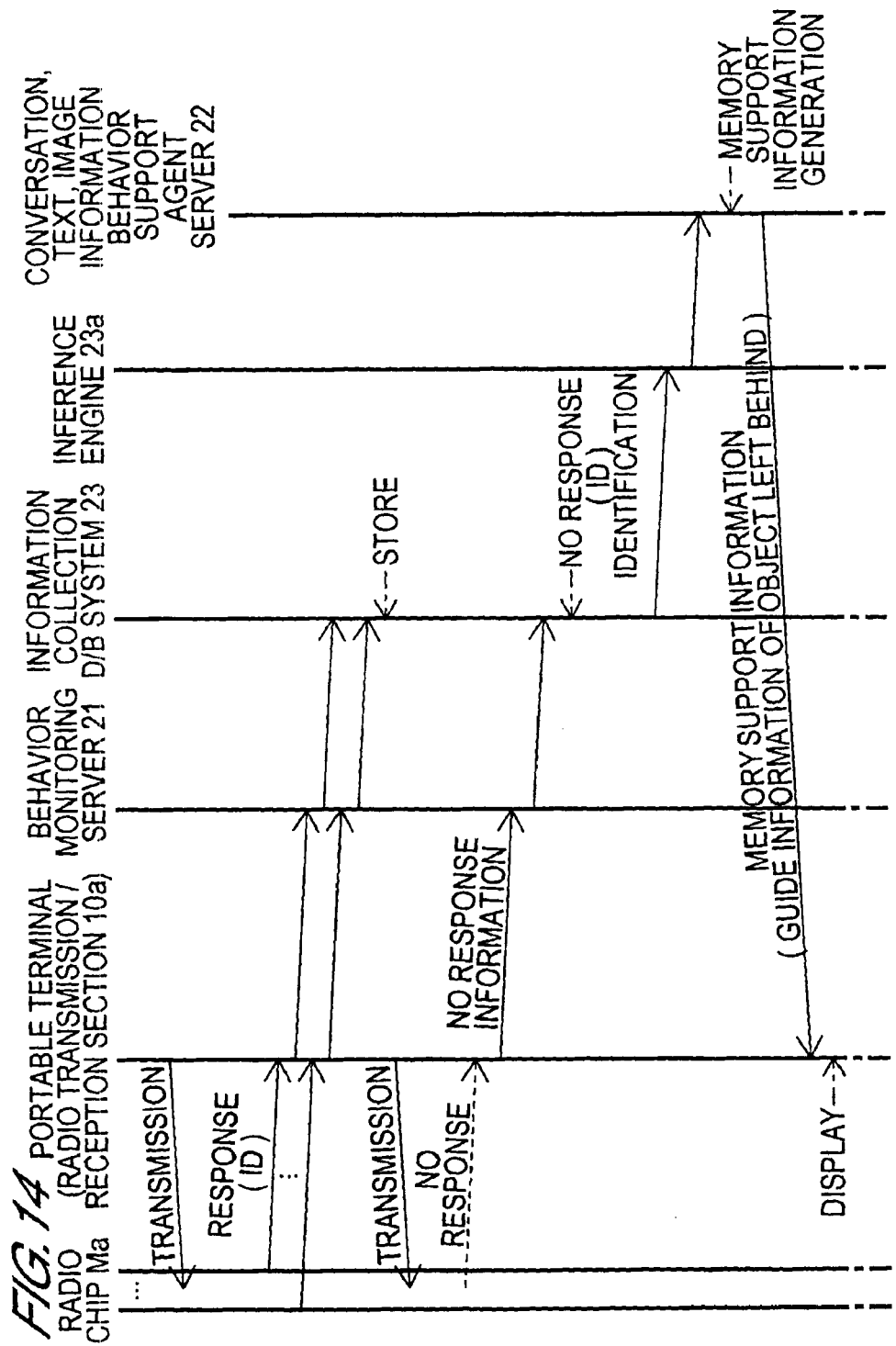
FIG. 14 is a sequence diagram of the third embodiment.
Figure 15:
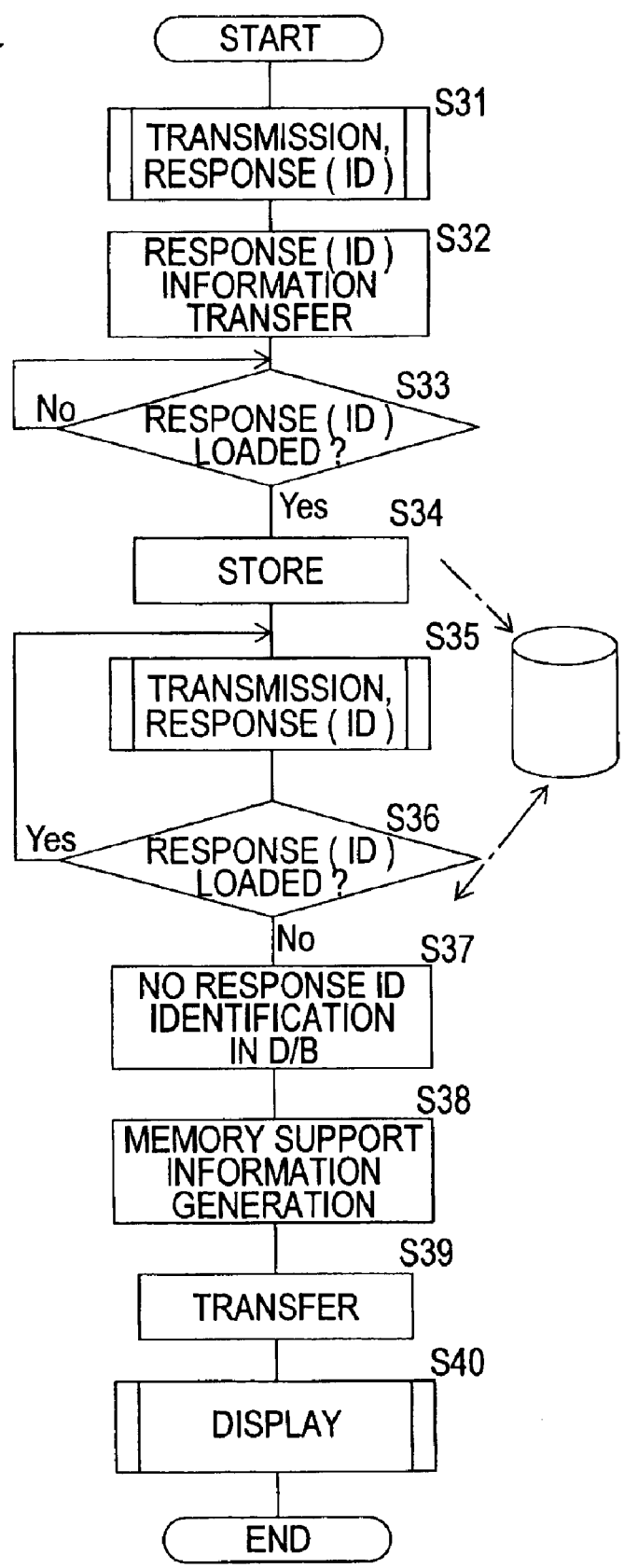
FIG. 15 is a flow chart depicting the processing procedure of the operation of the third embodiment.

FIG. 14 is a sequence diagram of the third embodiment. FIG. 15 is a flow chart depicting the processing procedure of the operation of the third embodiment.

In FIG. 15, the processing procedure is described regarding the behavior monitoring server 21 and the behavior support agent server 22 in FIG. 2 as one control system.

Referring to FIG. 12 to FIG. 15, the radio communication section 10a of the portable communication terminal 10 detects the individual identification information (ID) by the radio communication line using the radio blocks W1 and W2 with the radio chips 80a and 81a, which are attached to the bag 80 and the umbrella 81 respectively. This identification information indicates the bag 80 and the umbrella 81. The identification information (ID), which is a response of the radio chips 80a and 81a, is loaded by the portable communication terminal 10 by transmission of the radio communication section 10a, and is transferred to the communication network side equipment 3 via the communication network (steps S31, S32). In this transfer, individual identification information (ID) of the portable communication terminal 10 is also transferred.

After the behavior monitoring server 21 judges the loading of these two identification information (ID) by the communication network side equipment 3 as the behavior monitoring information (step S33), the two identification information (ID) are stored in the information collection D/B system 23 (step S34).

Hereafter, the radio communication section 10a of the portable communication terminal 10 continuously monitors the radio line connection with the radio chips 80a and 81a (bag 80, umbrella 81), and transfers the identification information to the communication network side equipment 3 (steps S35, S36). And a drop or interruption of the field strength is generated in the radio line connection in step S36 (step S37), and generation of a drop or interruption of this field strength is stored in the information collection D/B system 23 via the behavior monitoring server 21 as the behavior monitoring information.

The monitoring information of the radio line connection which is stored in this information collection D/B system 23 is also monitored by the inference engine 23a. When the inference engine 23a identifies information on the generation of a drop or interruption of the field strength, the inference engine 23a identifies the radio chips 80a and 81a where a drop or interruption of the field strength is generated in the radio chips 80a and 81a (bag 80, umbrella 81), which are stored in the information D/B system 23 in correspondence with the identification information (ID) of the portable communication terminal 10 (step S37).

With this identification, if the bag 80 (radio chip 80a) is identified, the behavior support agent server 22 generates the memory behavior support information that the bag 80 was left behind (step S38), and transfers the memory behavior support information to the portable communication terminal 10 (step S39). The portable communication terminal 10 notifies the individual carrying the portable communication terminal 10 (individual who has problems with memory) that the bag 80 was left behind by a synthesized voice, for example (step S40).

(Advantages of the Third Embodiment)

In this way, in the third embodiment, when the individual who has problems with memory loses a specific memory, that is, when a specific bag 80 or umbrella 81 is "left behind" in this case, memory support information to solve this problem on the spot with certainty can be provided by inference, personally and immediately. In other words, just like the first embodiment, appropriate behavior of an individual who has problems with memory and behavior support thereof become possible with certainty.

(Configuration and Individual Operation of Key Components of the Fourth Embodiment)

Figure 16:
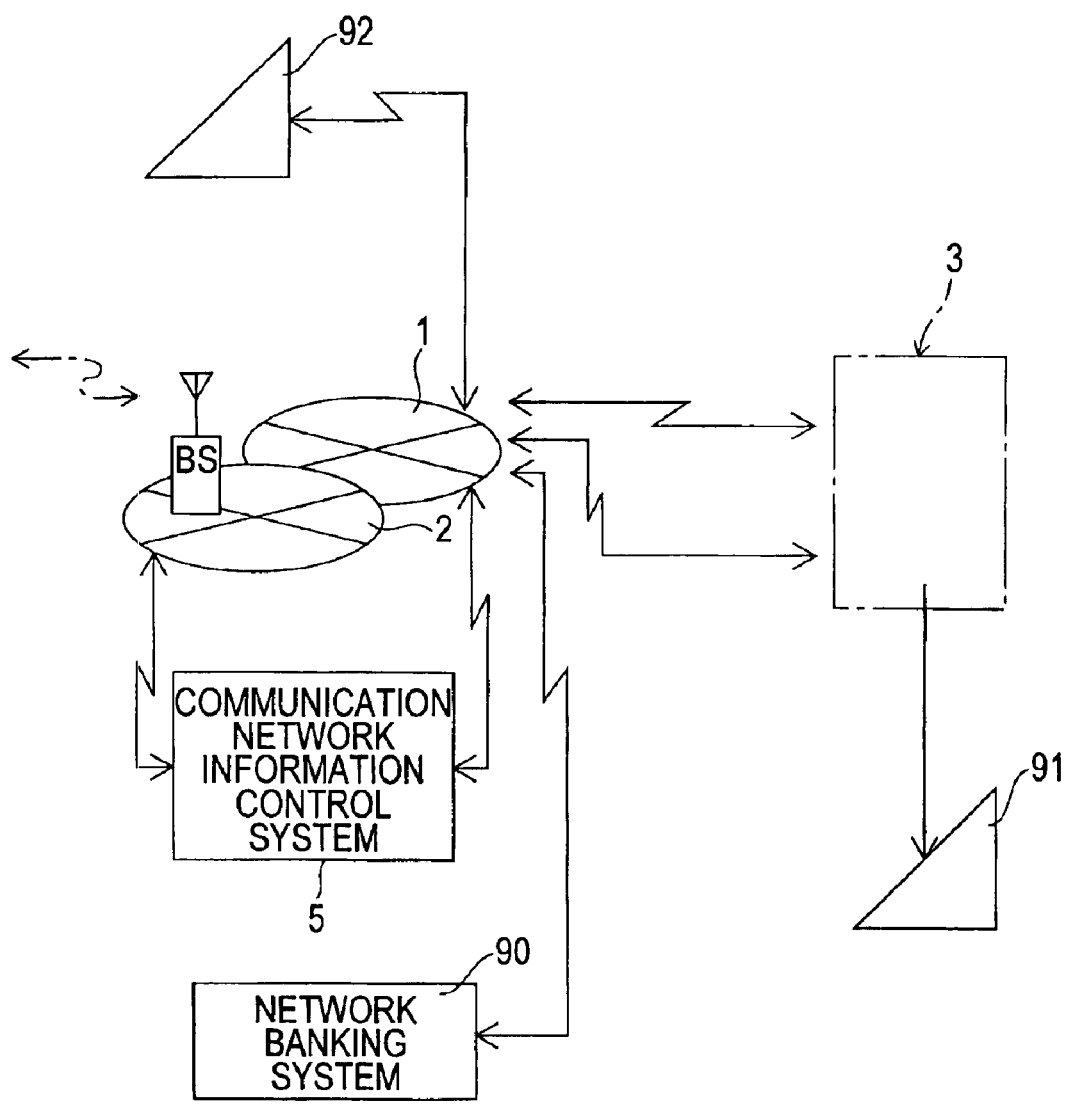
FIG. 16 is a bidirectional communication network diagram depicting a configuration example of the key components of the fourth embodiment.

FIG. 16 is a bidirectional communication network diagram depicting a configuration example of the key components of the fourth embodiment.

Referring to FIG. 16, the network banking system 90 and communication terminals 91 and 92, which are accommodated in the communication network side equipment 3 (e.g. connected to a line connection device (DSU, TA)) are connected to the cable communication network 1.

Now the individual operation of the above mentioned key components will be described.

The network banking system 90 is connected to the exchange operation system and accounting system of the net bank or credit card company. For charge settlements, a credit card, debit card, electronic money (e-cash/digital cash) and global net currency (beens) are known.

The communication terminal 91 is for receiving settlement information (settled amount, account name and number, user name, day of settlement, amount, etc.) and settlement completion notices for the network banking system 90, when a money settlement is generated at the communication network side equipment 3.

Here the "generation of money settlement" is the case when "appropriate behavior of the individual who has problems with memory and behavior support thereof" is charged, including insurance.

The communication terminal 92 is for setting a money settlement request from the communication network side equipment 3 by bidirectional communication with the network banking system 90.

(General Operation of the Fourth Embodiment)

FIG. 17 is a flow sequence diagram depicting the processing procedure of the operation of the fourth embodiment.

Referring to FIG. 16 and FIG. 17, a sequence similar to the first embodiment, for example, is executed from the portable communication terminal 10 to the behavior support agent server 22. And when the behavior support agent server 22 recognizes settlement (settlement is generated, information input from the outside, for example) (step S51), the communication network side equipment 3 (money settlement is generated) notifies this generation to the communication terminal 91 at "the side executing appropriate behavior of the individual who has problems with memory and behavior support thereof", and this communication terminal 91 transfers the settlement request (non-periodic or periodic) to the network banking system 90.

The network banking system 90 executes settlement (e.g. the above mentioned credit card, debit card, electronic money, global net currency) by setting a link with the communication terminal 92 at the portable communication terminal 10 side (side which receives information on "appropriate behavior of the individual who has problems with memory and behavior support thereof" (steps S52, S53).

After this settlement is executed, settlement completion is notified to the behavior support agent server via the communication terminal 91.

(Advantages of the Fourth Embodiment)

In this way, in the fourth embodiment, when the behavior support in the first to third embodiments is charged, including insurance, the settlement thereof can be executed appropriately and quickly on the bidirectional communication network.

(Variant Form of Embodiment 1)

In the above first to third embodiments, "personal lost memory information is completed with communication" using the communication network to execute behavior support for an individual who has problems with memory, but the present invention is not limited to this.

For example, the present invention can be embodied by using the behavior monitoring server 21, behavior support agent server 22 and information collection D/B system 23 (inference engine 23*a*) in the communication network side equipment 3 in FIG. 2 and a standalone computer, which has basic functions, and is carried by the individual carrying the portable communication terminal 10. In this case, the portable communication terminal 10 and the standalone computer are connected by wire or radio communication (e.g. Bluetooth, IrDA).

(Variant Form of Embodiment 2)

The above first to third embodiments were described using examples of performing Internet communication transmission with public access by TCP/IP protocol, but the present invention is not limited to this. For example, the present invention can also be embodied with a closed Intranet access. The present invention can also be applied to roaming operations overseas. And the present invention can also be embodied in a bidirectional communication network by X, Y and Z modem transmission systems.

(Variant Form of Embodiment 3)

The above mentioned first to fourth embodiments were described using one communication network side equipment 3 (see FIG. 2), but an embodiment may have a configuration where a plurality of communication network side equipment 3 are installed. For example, it is possible that an area is divided, a communication network side equipment 3 is installed in each divided area, and the plurality of communication network side equipment 3 are systematically controlled by a host computer. By this, roaming operations in a domestic or overseas area becomes possible.

Such design changes, which an expert in the art can easily think of, are all included in the present invention.

As the above description shows, according to the method for complementing the personal lost memory information with communication, and communication system and information recording medium thereof of the present invention, information to dispel the specific status where an individual who lost memory cannot take action to be performed next can be provided on the spot by inference, personally and instantaneously, and appropriate behavior of the individual who has problems with memory and behavior support thereof become possible with certainty.

What is claimed is:

1. A method for complementing personal lost memory information with communication, to provide information for dispelling a specific status where an individual who lost personal memory cannot take an action to be performed next, comprising the steps of:

a communication network side equipment collecting daily behavior monitoring information of said individual transferred from a communication terminal via a communication line;

said communication network side equipment loading information on a specific status where the individual who lost personal memory can not take an action to be performed next, which is transferred from said communication terminal, via a communication line; and said communication network side equipment generating memory support information by one or both of retrieval and inference for dispelling a specific status where the individual who lost personal memory cannot shift to action to be performed, and transferring the memory support information to said communication terminal via a communication line;

wherein when the specific status is not dispelled by the transfer of said memory support information from the communication line network side equipment to the communication terminal and the specific status information is transferred again from the communication terminal to the communication network side equipment, said communication network side equipment transfers at least one of conversation, text and image information to said communication terminal and executes the behavior monitoring again, executes one or both of retrieval and inference again from this information, and generates new memory support information.

2. The method for complementing personal lost memory information with communication according to claim 1, wherein said behavior monitoring information includes current absolute position information of said communication terminal, and is at least one type of communication information of conversation, text, and image in said communication terminal.

3. The method for complementing personal lost memory information with communication according to claim 1, wherein at least one type of information of map, traffic and weather, loaded from an equipment on the communication network, is newly added to said behavior monitoring information.

4. The method for complementing personal lost memory information with communication according to claim 1, wherein said memory support information is at least one type of information of conversation, text and image.

5. The method for complementing personal lost memory information with communication according to claim 1, wherein said behavior monitoring information is corrected by an external terminal.

6. The method for complementing personal lost memory information with communication according to claim 1, wherein during generation of said new memory support information, at least one of map information, traffic information which includes the structure of roads and inside of facilities, and weather information, is loaded from an equipment on the communication network, and new memory support information is generated by one or both of retrieval and inference again.

7. The method for complementing personal lost memory information with communication according to claim 1, wherein said memory support information is generated based on at least one of the following (a), (b) and (c):

(a) level, that is a degree of the problem with memory;

(b) layer, that is a depth of hierarchical explanation of the memory support information with respect to the degree of the problem with memory; and (c) range, that is a range of memory support information with respect to the degree of the problem with memory.

8. The method for complementing personal lost memory information with communication according to claim 7, wherein the memory support information is generated by one or both of retrieval and inference, based on at least one of said level, layer and range, such that when the set stages of said level, layer and range have changed, the stages of said level, layer and range for the individual who carries said communication terminal are automatically changed and set and the memory support information is generated by one or both of the next retrieval and inference based on these new stages of said level, layer and range.

9. The method for complementing personal lost memory information with communication according to claim 1, wherein the information on said specific status is information on a specific status including the length of time for which the absolute position information of the communication terminal does not change, and the specific status is identified by comparing this information on the specific status and a predetermined threshold value.

10. The method for complementing personal lost memory information with communication according to claim 1, wherein the information on said specific status indicates the status of an object left behind by a worsening or interruption of the field strength of the communication line connection status between the communication terminal and a non-contact storage element with no power supply which is attached to the object, and the memory support information is the notification of said object left behind.

11. A memory information complementary communication system for providing information for dispelling a specific status where an individual who lost personal memory cannot take an action to be performed next, comprising:

a portable communication terminal for transferring personal daily behavior monitoring information. and specific status information where the individual who lost personal memory cannot take an action to be performed next via a communication line;

a communication network side equipment which collects the behavior monitoring information from said portable communication terminal, receives the information on the specific status where the individual who lost personal memory cannot take an action to be performed next, which is transferred from said portable communication terminal, via the communication line, generates memory support information to dispel this specific status by one or both of retrieval and inference, and transfers the memory support information to said portable communication terminal via the communication line;

wherein said portable communication terminal or the fixed communication terminal further comprises:

absolute position information detection means for transferring the current absolute position information as the behavior monitoring information;

information transfer means for transferring at least one type of communication information of conversation, text and image; and wherein said communication network side equipment further comprises a behavior monitoring server, an information behavior support agent server for generating memory support information based on conversation, text and image, and information collection data base means for loading and storing at least one of behavior monitoring information, traffic information and weather information.

12. The memory information complementary communication system according to claim 11, further comprising information providing means for newly adding at least one type of information of map, traffic and weather to said behavior monitoring information, on the communication line network.

13. The memory information complementary communication system according to claim 11, wherein said portable communication terminal further comprises radio communication means for detecting the status of an object left behind by a worsening or interruption of the field strength of the communication line connection status with the non-contact storage element with no power supply, which is attached to an object carried by the individual who carries said portable communication terminal, so that the communication network side equipment generates and transfers memory support information of the object left behind.

14. A memory information complementary communication system for providing information for dispelling a specific status where an individual who lost personal memory cannot take an action to be performed next, comprising:

a non-contact storage element with no power supply which is attached to the individual;

a plurality of fixed communication terminals which transfers the personal daily behavior monitoring information and information on the specific status where the individual who lost personal memory cannot take an action to be performed next via a communication line by radio line connection with said non-contact storage element; and a communication network side equipment, which collects the behavior monitoring information from each one of said plurality of fixed communication terminals, receives the information on the specific status where the individual who lost personal memory cannot take an action to be performed next, which is transferred from said fixed communication terminal, via the communication line, generates memory support information to dispel this specific status by one or both of retrieval and inference, and transfers the memory support information to said fixed communication terminal via the communication line;

wherein said communication network side equipment further comprises a behavior monitoring server, an information behavior support agent server for generating the memory support information by conversation, text and image, and information collection data base means for loading and storing behavior monitoring information, and at least one of map information, traffic information and weather information.

* * * * *